US005584375A

United States Patent [19]

Burgess, Jr. et al.

[11] Patent Number: 5,584,375

[45] Date of Patent: Dec. 17, 1996

[54] SINGLE DRIVE VIBRATIONAL CONVEYOR WITH VIBRATIONAL MOTION ALTERING PHASE CONTROL AND METHOD OF DETERMINING OPTIMAL CONVEYANCE SPEEDS THEREWITH

[75] Inventors: Ralph D. Burgess, Jr., Plymouth; Fredrick D. Wucherpfennig, Bloomington, both of Minn.

[73] Assignee: Food Engineering Corporation, Minneapolis, Minn.

[21] Appl. No.: 360,603

[22] Filed: Dec. 21, 1994

[51] Int. Cl.$^6$ ...................... B65G 25/00

[52] U.S. Cl. .............. 198/751; 74/61; 198/750.1; 198/770

[58] Field of Search .............. 198/770, 750.1, 198/751; 74/61, 87

[56] References Cited

U.S. PATENT DOCUMENTS

| | | | |
|---|---|---|---|
| 2,876,891 | 3/1959 | Long et al. | 198/763 |
| 2,895,064 | 7/1959 | Hoff et al. | 310/29 |
| 2,918,926 | 12/1959 | Behnke et al. | 198/770 X |
| 2,951,581 | 9/1960 | Long et al. | 198/770 X |
| 2,997,158 | 8/1961 | Moskowitz et al. | 198/769 |
| 3,053,379 | 9/1962 | Roder et al. | 198/770 |
| 3,087,602 | 4/1963 | Hinkle, Jr. | 198/759 X |
| 3,195,713 | 7/1965 | Morris et al. | 198/759 |
| 3,209,894 | 10/1965 | Baechli | 198/610 |
| 3,327,832 | 6/1967 | Kyle | 198/630 |
| 3,332,293 | 7/1967 | Austin et al. | 74/61 |
| 3,348,664 | 10/1967 | Renner | 198/770 X |
| 3,358,815 | 12/1967 | Musschoot et al. | 195/770 X |
| 3,373,618 | 3/1968 | Miller et al. | 198/770 X |
| 3,465,599 | 9/1969 | Hennecke et al. | 74/61 |
| 3,604,555 | 9/1971 | Couper | 198/770 X |
| 3,621,981 | 11/1971 | Nimmo, Jr. et al. | 198/419.2 |
| 3,693,740 | 9/1972 | Lewis et al. | 198/630 X |
| 3,796,299 | 3/1974 | Musschoot | 198/770 X |
| 3,834,523 | 9/1974 | Evans | 198/763 |
| 3,848,541 | 11/1974 | Hondzinski | 198/630 X |
| 3,877,585 | 4/1975 | Burgess, Jr. | 198/771 X |
| 3,882,996 | 5/1975 | Musschoot | 198/770 |
| 4,162,778 | 7/1979 | Kraft | 198/763 X |
| 4,196,637 | 4/1980 | Barrot et al. | 74/61 |
| 4,255,254 | 3/1981 | Faust et al. | 74/61 X |
| 4,260,051 | 4/1981 | Burghart | 198/760 |
| 4,356,911 | 11/1982 | Brown | 198/766 |

(List continued on next page.)

FOREIGN PATENT DOCUMENTS

| | | | |
|---|---|---|---|
| 599119 | 5/1960 | Canada . | |
| 606585 | 10/1960 | Canada . | |
| 582872 | 2/1994 | European Pat. Off. | 74/61 |
| 55-89118 | 7/1980 | Japan . | |
| 55-140409 | 11/1980 | Japan . | |
| 307950 | 9/1971 | U.S.S.R. . | |
| 828219 | 2/1960 | United Kingdom . | |

OTHER PUBLICATIONS

Triple/S Dynamics, Inc., "Slipstick Conveyors" brochure.

*Primary Examiner*—David A. Bucci
*Attorney, Agent, or Firm*—Schroeder & Siegfried, P.A.

[57] ABSTRACT

Single drive conveyor apparatus including an elongated material-conveying conveyor having a vibration generator connected to one end thereof and vibrating the same substantially only in a direction parallel with the longitudinal centroidal axis thereof and including two pairs of parallel vibration-generating shafts, each pair having axial displacement relative to the other and each shaft of each pair carrying eccentrically mounted weights generating equal forces and rotating in opposite directions, each pair of shafts rotating at different speeds and each pair carrying a pair of equal force-generating and eccentric weights different from that of the other, a continuous flexible drive element having opposed continuums extending around and in driving relation to each of the pairs of shafts, and controllably shiftable phase-adjustment/motion-altering mechanism engaging each of the continuums and shortening one of the continuums while lengthening the other as the mechanism shifts to thereby controllably alter the axial displacement existing between the shafts of the two pairs.

47 Claims, 12 Drawing Sheets

U.S. PATENT DOCUMENTS

| | | | |
|---|---|---|---|
| 4,369,398 | 1/1983 | Lowry, Sr. | 198/751 X |
| 4,423,844 | 1/1984 | Sours et al. | 241/35 |
| 4,482,046 | 11/1984 | Kraus | 198/771 |
| 4,495,826 | 1/1985 | Musschoot | 198/770 X |
| 4,510,815 | 4/1985 | Baumers et al. | 198/770 X |
| 4,787,502 | 11/1988 | Sullivan et al. | 198/771 |
| 4,932,596 | 6/1990 | Sullivan et al. | 241/236 |
| 5,064,053 | 11/1991 | Baker | 198/770 X |
| 5,094,342 | 3/1992 | Kraus et al. | 198/761 |
| 5,131,525 | 7/1992 | Musschoot | 198/770 |
| 5,231,886 | 8/1993 | Quirk et al. | 198/770 X |
| 5,392,898 | 2/1995 | Burgess et al. | 198/770 X |
| 5,496,167 | 3/1996 | Diaz | 74/61 X |

SINGLE DRIVE VIBRATIONAL CONVEYOR WITH VIBRATIONAL MOTION ALTERING PHASE CONTROL AND METHOD OF DETERMINING OPTIMAL CONVEYANCE SPEEDS THEREWITH

BACKGROUND OF THE INVENTION

The instant invention is related generally to vibratory conveyors, and more specifically to the art of controlling the application of vibratory force to the material-conveying member of a conveying system so as to alter the motion thereof to adjust the speed and/or direction of conveyance for different materials having various different physical properties.

Vibratory conveyors have long since been utilized in manufacturing plants for conveying all types of various goods having different weights, sizes and other physical characteristics. Through the use of such conveyors, it has become apparent that articles having different physical characteristics frequently convey in a better manner under different vibratory motions, and therefore require a different application of vibratory force to the material-conveying member to obtain the optimal conveyance speed of the material being conveyed. It is also desirable under certain circumstances to change the direction in which the material is conveyed and to do so during the conveying operation.

Most conventional vibratory conveyors are of the type which "bounce" the conveyed goods along the path of conveyance on the material-conveying member of the conveyor system. Such conveyors of the conventional type generate a resultant vibratory force which is directed at an angle relative to the desired path of conveyance (angle of incidence), so that the material being conveyed is physically lifted from the material-conveying member and moved forwardly relative thereto as a result of the vibratory force applied thereto. In order for such a conventional "bouncing" vibratory system to operate effectively, the resultant vibratory force must be of a magnitude sufficient to overcome the weight of the material being conveyed and must have a substantial vertical component. The vertical component is undesirable due to the vertical forces resultant on the building structure supporting the conveyor, and also due to the product breakage which occurs in fragile products, due to the "bouncing."

The need to convey various materials of differing weights and physical characteristics more effectively has led to efforts in designing conveyor systems in which the direction and magnitude of the application of vibratory force to the material-conveying member, and consequently the motion thereof, may be altered to accommodate such differing materials. For such conveyors of the conventional type, efforts have been made to change the angle of incidence of the resultant vibratory force and/or the stroke in order to adjust the speed and/or direction of conveyance. For instance, as shown in U.S. Pat. No. 3,053,379, issued to Roder et al on Sep. 11, 1962, a conveyor system is provided with a pair of opposing counter-rotating eccentric weights which produce a resultant vibratory force along a centerline between such weights and through the center of gravity of the material-conveying member. Each eccentric weight is driven by a separate motor, and by reducing the power to one of such motors, the eccentric weight driven thereby is effectively pulled along by the rotational power of the first motor at a synchronous speed, but with the eccentric weight lagging in phase, thereby changing the angle of incidence of the resultant vibratory force applied to the material-conveying member.

By way of another example, as shown in U.S. Pat. No. 5,064,053, issued to Baker on Nov. 12, 1991, one of the rotating eccentric weights of the vibration generating means may be mechanically altered in its angular position relative to the two remaining rotating eccentric weights, thereby again causing a change in the angle of incidence of the resultant vibratory force, which may change the effective speed of conveyance, as well as the direction of conveyance, if desired. Attendant with such changes, however, is the undesirable introduction or exaggeration of a "bouncing" effect upon the products being conveyed on the conveyor.

More recently, however, because the "bouncing" nature of such conventional conveyors tends to damage the products conveyed thereby, and produces substantial noise and dust, product manufacturers have sought the use of conveyor systems of a different type which diminish the vibrational forces normal to the desired path of conveyance. Such improved conveyor systems, similar to a conventional SLIP-STICK® conveyor, manufactured by Triple S Dynamics Inc., located at 1031 S. Haskell Avenue, Dallas, Tex. 75223, or similar to that shown in U.S. Pat. No. 5,131,525, issued to Musschoot on Jun. 21, 1992, operate on the theory of a slow-advance/quick-return conveyor stroke, which conveys the product while advancing slowly, and causes the product to slip forwardly relative to the conveyor on the rapid return stroke, by breaking the frictional engagement of the material with the material-conveying member. Conveyors of this type do not have nearly the negative effects which are produced by the conventional "bouncing" type conveyor, since they employ motion which is substantially only parallel with the desired path of conveyance, and nearly eliminate all motion perpendicular (normal) thereto.

Because the resulting conveyor stroke of such improved conveyors must remain, insofar as possible, devoid of components of force in a direction normal to the desired path of conveyance, it is not desirable to change the angle of incidence of the resultant vibratory force. To do so would destroy the intended function and mode of operation of such a conveyor system. Therefore, as shown in U.S. Pat. No. 5,131,525, the vibratory drive systems of such conveyors are set such that the eccentric weights used for generating the resultant vibratory force are maintained in a fixed position relative to one another, thereby creating the desired slow-advance/quick-return stroke which is substantially only in a direction parallel with the desired path of conveyance. Such conveyors, however, provide no mechanical means for easily adjusting the application of vibratory force to the material-conveying member.

As can be seen from the above, there is a distinct need for a vibratory conveyor system which is capable of transmitting vibratory forces to the material-conveying member substantially only in a direction parallel with the desired path of conveyance, while providing means for adjusting the application of vibratory force to the material-conveying member, without altering the angle of incidence of the line of vibratory force generated thereby. Providing such capability in a single vibratory conveyor system will enable the user thereof to easily and effectively change the motion of the material-conveying member to match the physical characteristics of the material being conveyed thereby, and to alter the speed and/or direction of conveyance, without destroying the intended function of the conveyor system by introducing undesirable components of force in a direction normal to the desired path of conveyance for the material.

BRIEF SUMMARY OF THE INVENTION

To meet the above objectives, we have developed a vibratory conveyor system which operates with a slow-advance/quick-return conveyor stroke that is directed substantially only along a line parallel with the longitudinal centroidal axis of the material-conveying member, and which includes means for controlling the application of vibratory force to the material-conveying member. Through our unique construction, the application of vibratory forces to the material-conveying member may be altered at will while the conveyor is in operation, without affecting the direction of the resultant line of vibratory force, and without introducing any component of force which is transverse to the desired path of conveyance.

Our conveyor system includes a vibration-generating means which has a single drive motor for driving opposing parallel pairs of counter-rotating half-speed and full-speed eccentrically weighted vibrator shafts. The first pair of parallel opposing counter-rotating shafts, which may be referred to as half-speed shafts, are symmetrically positioned and disposed transversely and substantially balanced on opposite sides of the longitudinal centroidal axis of the material-conveying member. These counter-rotating half-speed shafts carry corresponding opposing eccentrically mounted weights which generate substantially equal force and are cooperatively positioned relative to one another so as to cancel substantially all of each other's centrifugal vibratory forces which are generated in a direction normal to the longitudinal centroidal axis of the material-conveying member. Therefore, the resultant force produced by the eccentric weights carried by the half-speed shafts is always along a line substantially only in a direction parallel with the longitudinal centroidal axis of the material-conveying member, and parallel with the desired path of conveyance.

It is noteworthy that the substantially equal force generated by each of the opposed eccentrically mounted weights can be generated either by the opposed weights having equal masses and their supporting arms being of equal length, or by the opposed weights being of unequal weights and the lengths of their supporting arms being such that the centrifugal force which is generated by each is equal. In each instance, it is the ultimate centrifugal force which is generated that is of importance within each pair, and that force can be accomplished by varying the length of the support arm to compensate for differences in the mass value of the weight it carries, or vice versa.

The second pair of parallel opposing counter-rotating shafts, which may be referred to as full-speed shafts, are symmetrically positioned adjacent to the half-speed shafts, and are transversely disposed and substantially balanced on opposite sides of the longitudinal centroidal axis of the material-conveying member. These opposing counter-rotating full-speed shafts also carry corresponding opposing eccentrically mounted weights which generate substantially equal force and are cooperatively positioned so as to cancel substantially all of each other's centrifugal vibratory forces which are generated in a direction normal to the longitudinal centroidal axis of the material-conveying member. These full-speed shafts are driven by the same motor and single drive belt at a speed of twice the speed of the half-speed shafts, but their phase relation to the half-speed shafts may be varied through the use of our new phase-adjustment/motion-altering mechanism to produce a desired relative angular displacement or phase differential between the angular position of the eccentric weights carried by the half-speed shafts and those eccentric weights carried by the full-speed shafts.

As used herein, the phrase "relative angular displacement" or "phase differential" means the extent of angular difference between the relative angular position of an eccentric weight carried by a full-speed shaft and the relative angular position of an eccentric weight carried by a half-speed shaft at a "home" or "starting" position. For instance, a 0 degree phase differential is defined such that, when product conveyance is from left to right away from the vibration-generating means, at one instant in time, the eccentric weight of reference of a half-speed shaft is at its left horizontal point of rotation (its "home" position), and the eccentric weight of reference of a full-speed shaft is also at its left horizontal point of rotation. Then, a 60 degree rotation of the full-speed shafts away from their "home" or "starting" position, and against their established direction of rotation, with the half-speed shaft being maintained at its left horizontal position, will create a negative 60 degree phase differential between the half-speed and full-speed shafts.

Changing the speed of the drive motor, and consequently that of the single drive belt, does not alter the angular relationship of the eccentric weight on one half-speed shaft relative to the eccentric weight on the other half-speed shaft. Likewise, changing the speed of the motor has no effect on the angular relationship of the eccentric weight on one full-speed shaft relative to the eccentric weight on the other full-speed shaft. Changing the speed of the single drive motor and single drive belt merely causes the eccentric weights carried by opposing half-speed shafts, and the eccentric weights carried by opposing full-speed shafts, to continue to cancel substantially all of each other's vibratory forces generated in a direction normal to the longitudinal centroidal axis of the material-conveying member. Also, changing the speed of the drive motor does not of itself alter the phase angle relationship between the half-speed and the full-speed shafts. However, by altering only the angular position of the eccentric weights carried by the half-speed shafts relative to the eccentric weights carried by the full-speed shafts, the direction of the resultant line of vibratory force generated will not change, but the application of the vibratory force to the material-conveying member will change. This is accomplished by adjusting the phase-adjustment/motion-altering mechanism so as to alter the relative angular positions. This enables an operator of the conveyor system to change the application of vibratory force to better handle materials having different physical properties, and obtain the optimal conveyance speed therefor, without introducing undesirable forces in a direction normal to the desired path of conveyance.

For any given material and at a particular rotational drive speed, the relative angular phase relationship between the eccentric weights carried by the half-speed and full-speed shafts may be continually monitored and adjusted until the best application of vibratory force to the material-conveying member is determined, which will produce the optimal conveyance speed for the particular material being conveyed thereby. By making such phase adjustments between the angular position of the eccentric weights carried by the half-speed shafts relative to the angular position of the eccentric weights carried by the full-speed shafts at a particular rotational drive speed, both the speed of conveyance, including zero speed, and direction of conveyance may be altered at will during the operation of the conveyor system, without introducing any undesirable components of force in a direction normal to the longitudinal centroidal axis of the material-conveying member or path of conveyance defined thereby. This represents a distinct advantage over conventional prior art conveyor systems which necessarily require stopping of the conveyor to make a mechanical adjustment or change of parts to effect a change in the direction of the resultant line of vibratory force in order to change the speed or direction of conveyance.

As hereinafter described, a graph showing the measured conveying velocity for a potato chip product versus the phase relationship between the relatively fast and slower weighted shafts, at a particular shaft rotational speed, is shown in FIG. 14, submitted herewith. It should be noted that not all products produce such a smooth curve. By adjusting the phase-adjustment/motion-altering mechanism accordingly, while the conveyor is conveying a product, the optimal conveyance speed can be obtained. This optimum speed frequently is not the highest speed which can be obtained.

It should also be noted that changing the rotational speed of the eccentrically weighted shafts may cause the maximum product conveying velocity to occur at a different phase differential between the half-Speed and full-speed shafts. A graph showing the measured product conveying velocities versus the negative phase differential of the full-speed shafts for a crisp rice breakfast cereal product at different rotational speeds of the half-speed shafts is shown in FIG. 15. It should be noted that for this product, and for most products generally, the maximum conveying velocity occurs at an increased negative phase differential as the conveyor rotational speed increases.

Some conveyors may be equipped with a variable speed drive as well as the phase-adjustment/motion-altering mechanism of the invention herein, which will allow adjustment of both phase differential and rotational speeds to arrive at the optimal product conveyance speed. As the rotational speeds of the half-speed and full-speed shafts are increased, the centrifugal forces they generate are also increased, and there is a practical design high speed limit for the vibration-generating mechanism.

As hereinafter described, the phase-adjustment/motion-altering mechanism is constructed and arranged so as to shorten the upper continuum of the drive belt as it lengthens the lower continuum thereof, and vice versa. The shortening and lengthening of the continuums is accomplished by operating a reversible air motor, or electric motor or other power source, which is connected in driving relation to the vibration-altering mechanism via a screw mechanism. Such changes cause the relative angular phase relationship between the half-speed shafts and the full-speed shafts to be altered and thereby change the material conveying velocity. Once the optimum velocity is determined, the position of the phase-adjustment/motion-altering mechanism can be maintained by a sensor which is provided for that purpose.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which.

DETAILED DESCRIPTION OF THE INVENTION

Figure 1:
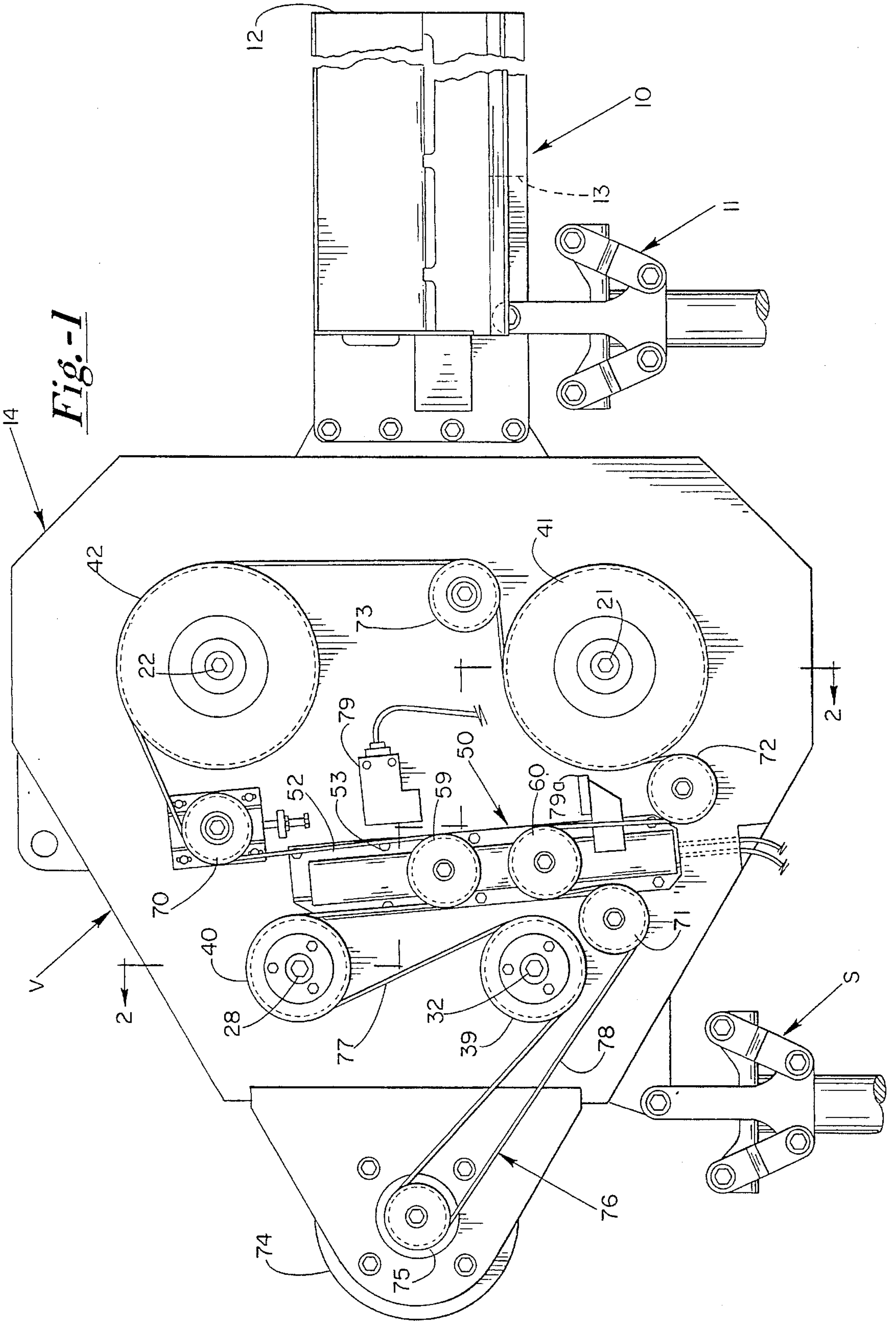
FIG. 1 is a front side elevational view of a conveyor vibrating mechanism having one of our phase-adjustment/motion-altering mechanisms mounted thereon.

The preferred form of our invention is shown in FIGS. 1–7, inclusive. As best shown in FIG. 1, it includes an elongated conveyor indicated generally by the numeral 10 having a longitudinal centroidal axis and which is supported by a support mechanism 11 for insuring movement of the conveyor in substantially a single plane. The details of the mechanism 11 and the manner in which it functions is described in U.S. patent application Ser. No. 08/253,768, entitled "Conveyor Support Apparatus for Straight-Line Motion," filed by Ralph D. Burgess, Jr., on Jun. 3, 1994, now matured into U.S. Pat. No. 5,460,259, dated Oct. 24, 1995, which application is incorporated herein by reference thereto and discloses and claims a separate invention. U.S. patent application Ser. No. 08/254,320, entitled "Dual Drive Conveyor System with Vibrational Control Apparatus and Method of Determining Optimum Conveyance Speed of a Product Therewith," filed by Ralph D. Burgess, Jr., David Martin, and Fredrick D. Wucherpfennig on Jun. 6, 1994, now matured into U.S. Pat. No. 5,392,898, dated Feb. 28, 1995, is also related to this patent application and is incorporated herein by reference thereto and discloses and claims a separate invention. The dual drive invention has separate drives for the half-speed and full-speed shafts and refers to the half-speed shafts as "master" shafts and the full-speed shafts as "slave" shafts because they are not mechanically tied together and the "slave" is directly responsive to the "master" by means of electronic sensors and controls. The instant invention, however, has the half-speed and full-speed shafts mechanically tied together through a common drive timing belt with a single drive motor so as to not be in a master/slave relationship, and the rotary eccentrically weighted shafts of this invention are, therefore, referred to throughout as half-speed and full-speed shafts. The vibration-generating means, as shown in FIG. 1, is identified generally by the letter V.

As best shown in FIG. 1, the conveyor 10 has opposite discharge and product receiving ends 12 and 13, respectively. The product receiving end 13 terminates, as shown, well beyond the support 11 so that it may become the discharge end, if and when the direction of conveyance is reversed, as hereinafter described. The entire vibration-generation mechanism V is further supported by a support mechanism S, at its opposite end, which is similar in construction and operation to the support mechanism 11. As shown, the vibration-generating mechanism V is connected to the very end of conveyor 10 at the longitudinal centroidal axis of the conveyor.

Figure 2:
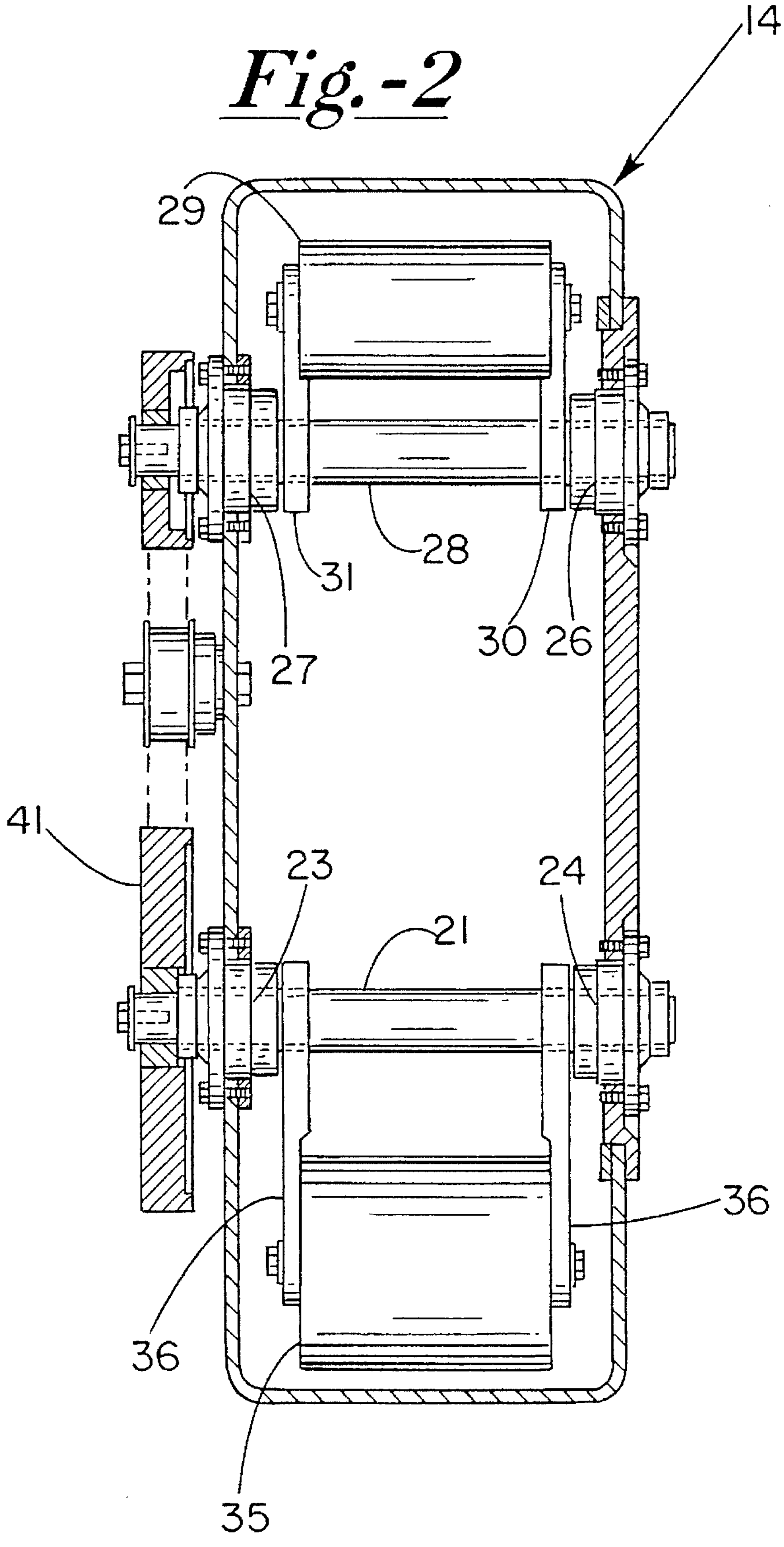
FIG. 2 is a vertical sectional view taken along line 2—2 of FIG. 1.
Figure 3:
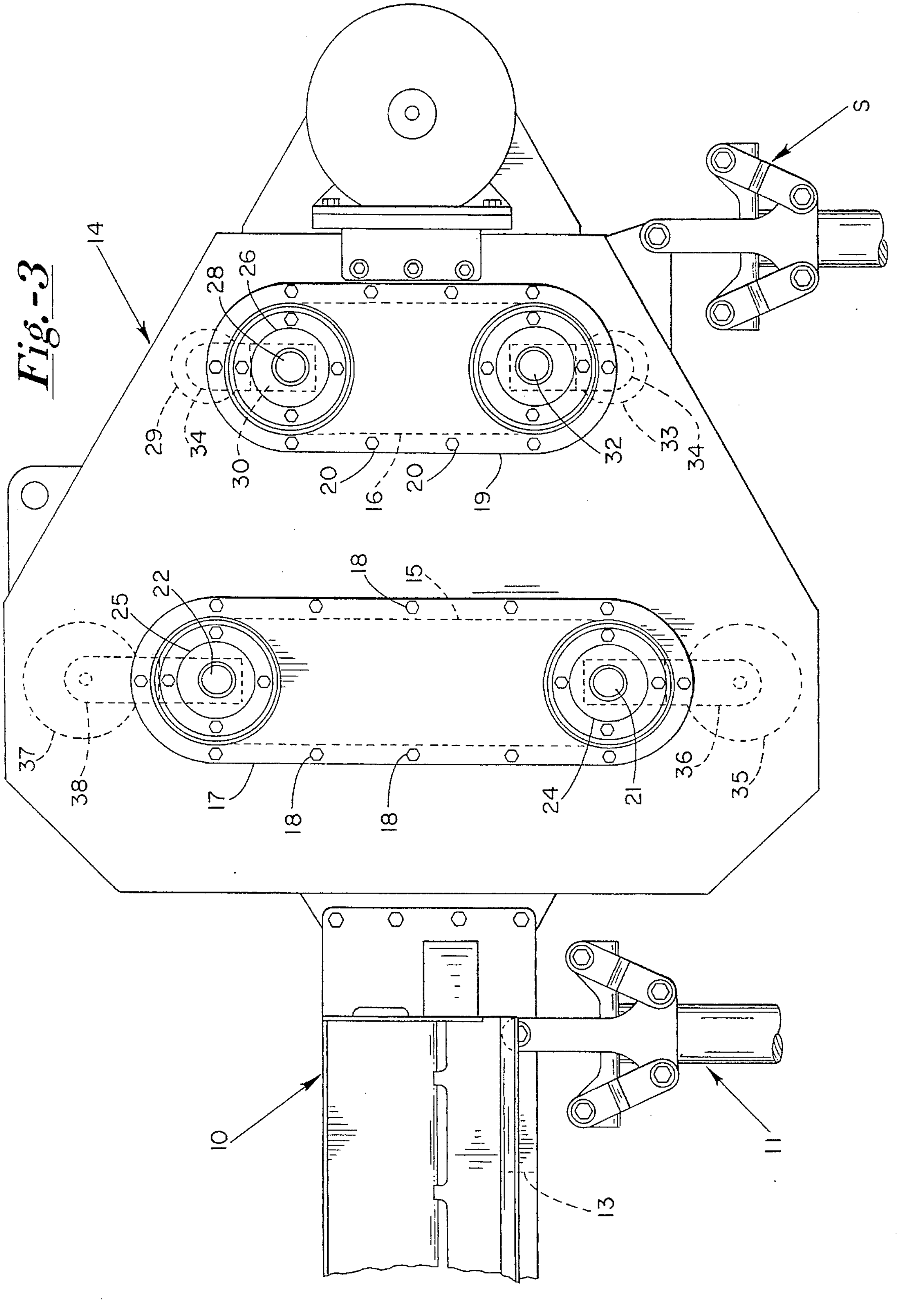
FIG. 3 is an opposite side elevational view of the conveyor vibrating mechanism shown in FIG. 1.

The vibration-generating mechanism V includes, as best shown in FIGS. 1 and 2, a generally rectangular shaped, in cross-section, housing 14 which has a pair of vertically extending elongated openings 15 and 16 formed in the rear wall, as best seen in FIG. 3. A cover plate 17 is secured by bolts 18 over the opening 15, and a second cover plate 19 is similarly secured by bolts 20 over the opening 16.

Mounted for rotation within the upper and lower portions of the housing 14 is a pair of vertically spaced vibration-generating half-speed shafts 21, 22. As best shown in FIG. 2, shaft 21 is supported in bearings 23 and 24, while shaft 22 is mounted in the upper portion of the housing in similar bearings, such as indicated by the numeral 25 in FIG. 3, only one of which is shown.

As best shown in FIG. 2, full-speed vibration-generating shaft 28 is mounted in bearings 26, 27 and carries a weight 29 which is supported by a pair of support arms 30, 31. These arms are fixedly connected to the shaft 28 and swing with the shaft 28 as it is rotated.

Mounted upon the lower full-speed shaft 32 is a similar weight 33 which generates a force equal to that generated by weight 29, and which is supported by a pair of support arms, such as identified by the numeral 34, as best shown in FIG. 3, only one of which is shown. Like the weight 29, the weight 33 is fixedly secured by the above pair of support arms to its shaft 32. Thus, there is a pair of full-speed vibration-generating shafts which are spaced vertically, are counter-rotated, and carry symmetrically balanced force-producing weights.

Mounted within the housing 14 upon shaft 21, for swinging movement therewith, is a weight 35 having a heavier mass than those carried by the rotatable shafts 28 and 32. This weight is supported by a pair of support arms, as best shown in FIG. 2, each being identified by the numeral 36.

Likewise, upper shaft 22 carries a weight 37 which generates a force equal to that generated by the weight carried by the shaft 21 and is supported by a similar pair of support arms, such as support arm 38, fixedly mounted on the shaft 22 and revolving therewith, one of which is not shown.

Mounted upon the forwardly protruding end of each of the shafts described hereinabove is a drive pulley. Thus, full-speed shaft 32 carries a full-speed drive pulley 39 of equal diameter to the full-speed drive pulley 40 which is carried by shaft 28, and is driven in a counter-rotating direction. Likewise, shaft 21 carries a drive pulley 41 which is the same size as the pulley 42 that is carried by shaft 22, and is of equal diameter. Pulleys 41 and 42 are rotated at the same speed in counter-rotating direction by the drive belt to be hereinafter described.

It will be seen by reference to FIG. 3 that the equal and opposite weights of each of the vibrating shafts may be mounted so as to extend in opposite directions at the same instant, so that the effect of each weight in a direction normal to the conveyor, as they swing in opposite directions, is counteracted by that of the vibrating shaft and other equal force-generating weight of the pair. Since all of the shafts are driven by the same drive belt and since the diameter of the drive pulley for each shaft in each pair is equal, the two shafts in each pair rotate at the same speed but in opposite directions. Also, the diameter of the full-speed pulleys is equal to one-half the diameter of the half-speed pulleys, thus driving the full-speed shafts at twice the speed of the half-speed shafts.

Figure 5:
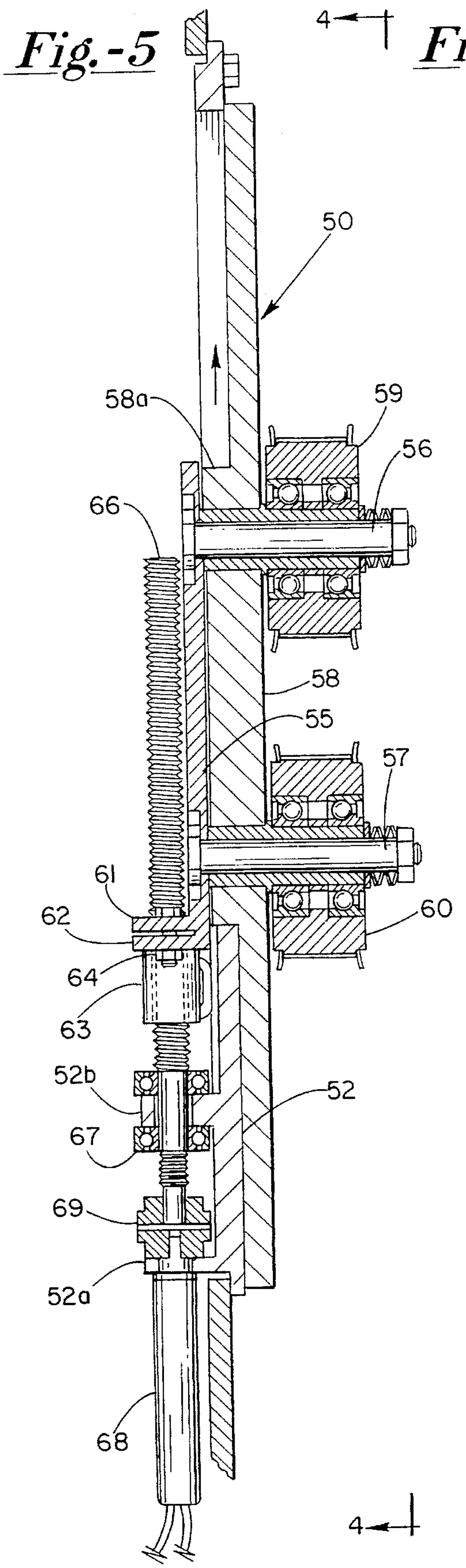
FIG. 5 is a vertical sectional view taken through the phase-adjustment/motion-altering mechanism.
Figure 4:
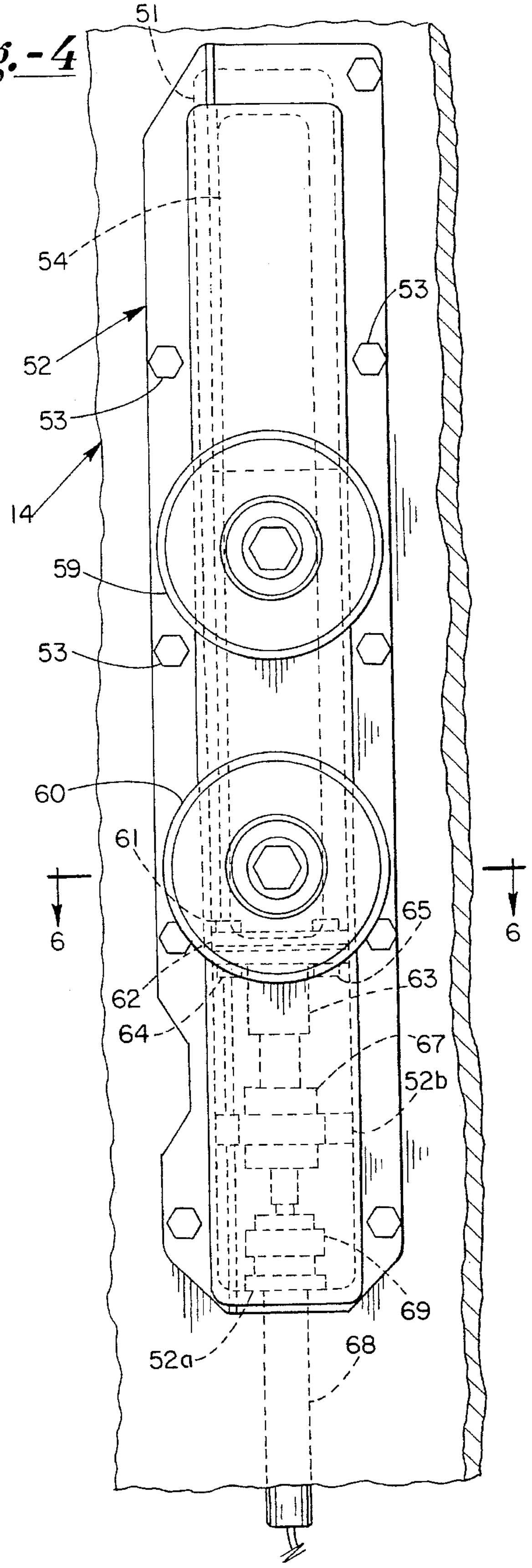
FIG. 4 is a fragmentary elevational view of the phase-adjustment/motion-altering mechanism, on an enlarged scale, taken alone line 4—4 of FIG. 5.
Figure 6:
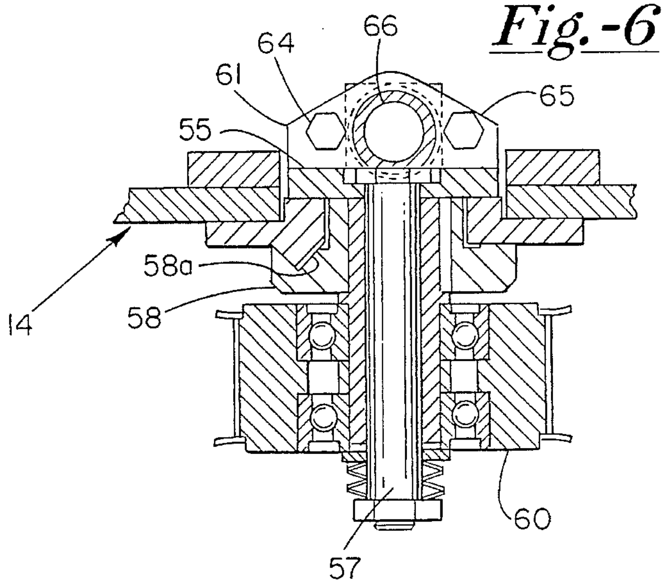
FIG. 6 is a horizontal sectional view taken along lines 6—6 of FIG. 4.
Figure 7:
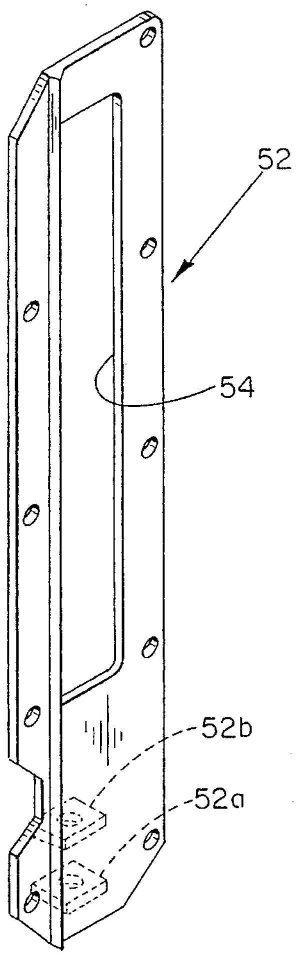
FIG. 7 is a perspective view of the inner-panel way member of the phase-adjustment/motion-altering mechanism.

The phase-adjustment/motion-altering mechanism 50 is best shown in FIGS. 1 and 4–8. It is mounted in an elongated vertically extending opening 51 which is formed in the front face of housing 14. As best shown in FIG. 4 and 7, it includes an elongated way member 52 which functions as a cover for the opening 51 and includes a pair of longitudinally spaced mounting flanges **52*a* and 52*b* which extend normally therefrom at the lower end thereof and each of which has a transverse bore for purposes to be hereinafter described. The way member 52 is secured to the front face or surface of the housing 14 by bolts or screws 53**.

Figure 8:
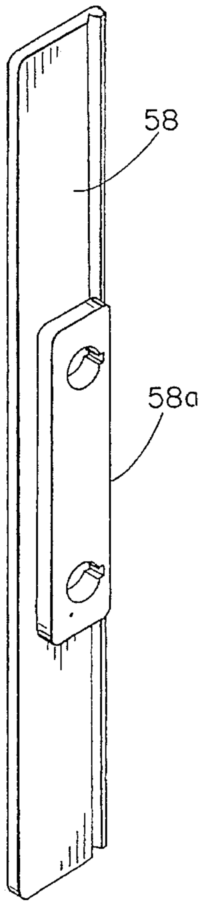
FIG. 8 is a perspective view of the outer panel way-follower of the phase-adjustment/motion-altering mechanism.

FIG. 5 shows an elongated inner slide panel 55 which supports a pair of transversely and outwardly extending support shafts 56 and 57. These support shafts extend out through the outer sliding panel 58 through a bore provided therefor, and each supports an idler pulley, as shown, and identified as 59, 60. Thus, the inner sliding panel 55 carries the outer sliding panel 58 with it as it moves vertically within the way opening 54 of the way member 52. As best shown in FIGS. 6–8, the outer sliding panel 58 has a way follower portion **58*a* which extends longitudinally thereof and inwardly therefrom, and guides the outer sliding panel 58 as it moves along the elongated way member 52**.

As best shown in FIG. 5, inner slide panel 55 carries a pair of inwardly extending spaced support ears 61, 62. A ball nut 63 is threaded into the bore of each of these support ears. A pair of bolt/nut combinations 64, 65 (see FIG. 6) extend transversely through the support ears 61, 62 to wedge the ball nut 63 in fixed position relative thereto, when the nuts are tightened to draw said support ears toward each other.

An elongated screw 66, which is held in place by the bearings 67, is threaded through ball nut 63 and cooperatively drives the sliding panels 55 and 58 upwardly and downwardly, depending upon the direction of rotation of the screw 66 about its longitudinal axis. The thrust load of the screw 66 is borne by the bearings 67 as the screw rotates. Thus, rotation of screw 66 causes idler pulleys 59 and 60 to be moved upwardly or downwardly together, depending upon the direction of rotation of the screw.

As also best shown in FIG. 5, bearings 67 are mounted upon mounting flange 52*b* of the way member 52 and support the screw 66 as it rotates about its longitudinal axis. An air motor 68 is connected to the lower end of the screw 66 by a coupling 69 so as to drive the screw 66 in either direction of rotation, since the air motor 68 is reversible. Control means for controllably reversing the air motor is provided but has not been shown, since it is not part of the invention.

Also mounted upon the front surface of the housing 14, and located as best shown in FIG. 1, is a plurality of idler pulleys 70, 71, 72, and 73. Mounted on the rear end of the housing 14 is a motor 74 having a drive pulley 75 around which the drive belt 76 extends. As shown in FIG. 1, the drive belt 76 has an upper continuum 77 and a lower continuum 78, the upper continuum 77 passing around the uppermore of the two half-speed and full-speed pulleys, as well as around the pulley 59 of the upper portion of the phase-adjustment/motion-altering mechanism, while the lower continuum 78 passes around the lower half-speed pulley 41 and the pulley 60 of the lower portion of the phase-adjustment/motion-altering mechanism, all in driving relation.

The outer driving circumference of each of the pulleys 39, 40, 41 and 42 have a plurality of circumferentially spaced axially extending ribs disposed around their circumferential surface to cooperate with corresponding drive lugs carried by the drive belt 76, all in a manner well known in the art, so as to accomplish the driving function of the drive belt 76.

As best shown in FIG. 1, the drive belt 76 extends from the motor 75 downwardly around the lower circumferential surface of the idler pulley 71 and thence upwardly, over and around the lower pulley 60 of the phase-adjustment/motion-altering mechanism 50, then downwardly and around idler pulley 72 and then upwardly around a portion of the upper circumferential surface of half-speed pulley 41. From there, it passes under and upwardly around the idler pulley 73 and thence upwardly and around the upper half-speed pulley 42. From there, it passes over, down and around idler pulley 70 and thence downwardly, around and under pulley 59 of the phase-adjustment/motion-altering device 50, from whence it passes upwardly around and over full-speed pulley 40 and thence downwardly and around the lower full-speed pulley 39 and back to the drive pulley 75. As indicated hereinbefore, the half-speed pulleys 41 and 42 travel at a speed half that of the full-speed pulleys 39 and 40, irrespective of the position of the phase-adjustment/motion-altering mechanism, since they are all driven by the same drive belt 76.

It will be readily seen that, when the weights of the half-speed and full-speed pulleys are in the positions shown in FIG. 3, driving of the pulleys and their respective shafts by the drive belt 76 will cause the effect of the weight of the uppermost of each pair of shafts to counteract the effect of the other and lower weight of the pair, since they are rotated in counter-rotating directions as a result of the manner in which the drive belt 76 is passed around the circumference of each of the associated pulleys. Thus, the effect of each of the weights in a vertical direction is always negated by the effect of the opposite weight of each pair and, thus, no vertical component is applied to the conveyor as a result of the rotation of the vibration-generating shafts. Because of this arrangement, the vertical forces generated by any one of the weights will always be canceled by an opposing force generated by the opposite weight of the pair. However, due to the same arrangement, the horizontal forces generated by any one of the weights will not be cancelled by the opposing weight of the pair. Rather, the horizontal forces generated by each weight will be added to those forces generated by the opposing weight of the pair. This arrangement permits a desired preferred horizontal force generation which may be different for different products. Since each of the weights generates an equal force with respect to the opposing weight of the pair, there is no twisting moment of the vibration-generating shafts about a vertical axis. Since the weights are symmetrically positioned along the longitudinal centroidal axis of the trough, the resultant horizontal force generated thereby continuously acts along the longitudinal centroidal center of the conveyor.

An electronic sensor 79 is also mounted on the front surface of the housing 14 and is directed downwardly against a sensor target 79*a* which is mounted on the phase-adjustment/motion-altering mechanism 50 and moves vertically therewith toward and away from the sensor 79. Thus, the operator can note and maintain the position of the mechanism 50, wherever it is positioned, when an optimum speed for a particular product has been determined by repeated adjustments by the operator of the upper and lower belt continuums.

Under one set of exemplary conditions, as shown in FIG. 2 and 3, weights 37 and 35 of the half-speed shafts generate a total force in a direction parallel to the longitudinal axis of the trough nearly equal to the total force generated by weights 29 and 33 of the full-speed shafts rotating at twice the speed. Of course, the above ratio between generated forces may be altered as desired to create the optimum magnitude of vibratory force to be applied to the material-conveying member 10 for a given situation. The forces generated by the two pairs of shafts and their associated weights and support arms may be equal or, as indicated above, the forces generated by one pair of shafts may exceed that of the other pair, to provide different results, as desired. These results can be obtained by varying the values of the weights and the lengths of the arms which support those weights upon the shafts.

As indicated above, it has been found preferable to operate shafts 28 and 32 at a normal speed which is twice that of shafts 21 and 22. Although it is contemplated that other speed ratios between the shafts 28, 32 and shafts 21, 22 may be used to provide a given application of vibratory force, it has been found that the ratio of 2:1 is most effective in providing the desired slow-advance/quick-return conveyor stroke for conveying materials. To maintain the speed of shafts 28 and 32 at twice the speed of shafts 21 and 22, pulleys 39 and 40 are constructed at one-half the diameter of pulleys 41 and 42.

Figure 9:
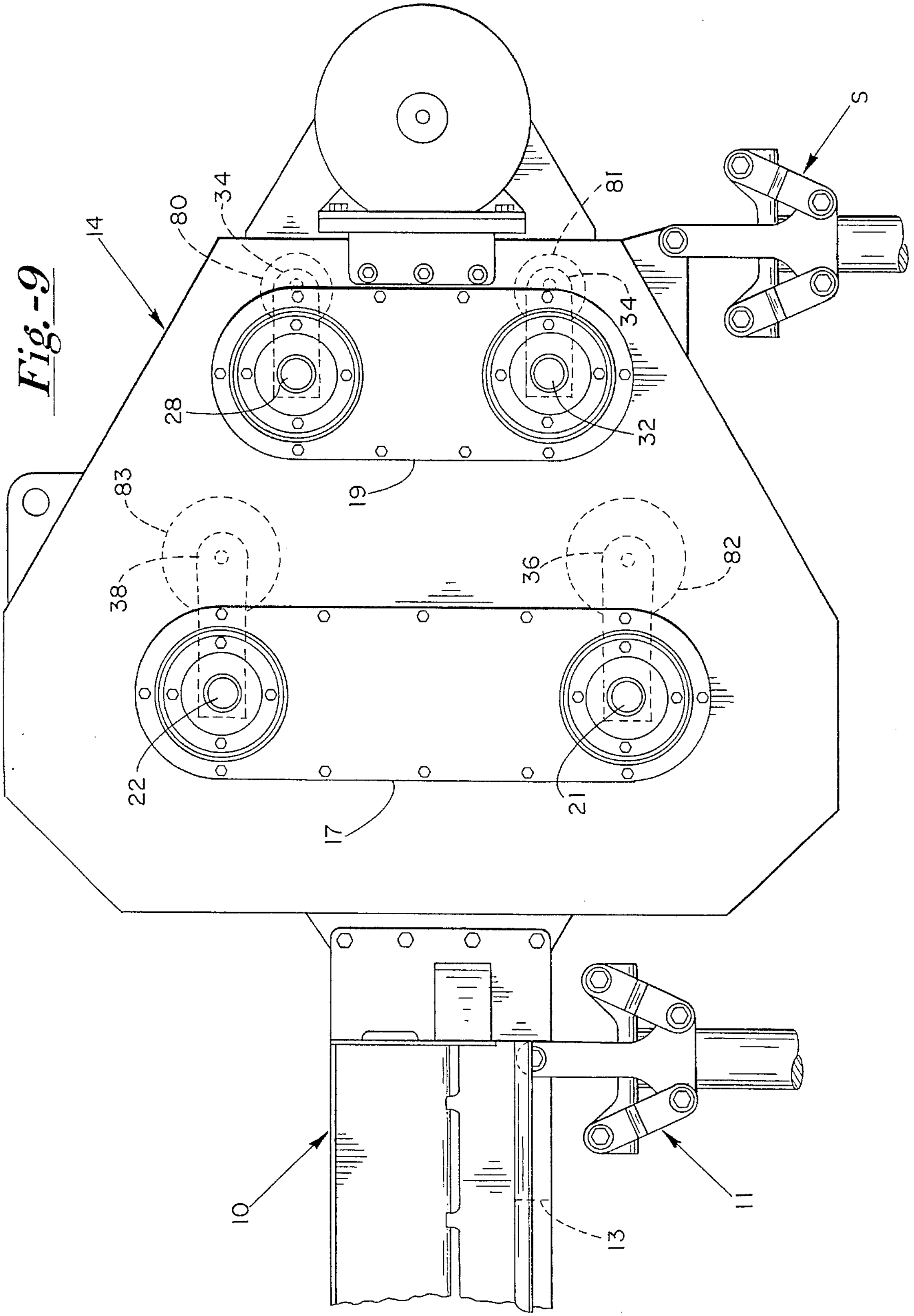
FIG. 9 is a side-elevational view of the same conveyor vibrating mechanism, similar to FIG. 3, with all of the weights shown extending in the same direction which is different from that shown in FIG. 3.

To illustrate the effect of a 2:1 speed ratio between shafts 28, 32 and shafts 21, 22, reference is made to FIG. 9, where an exemplary set of weights are shown in phantom at a given nominal angular orientation relative to one another, such that, at one instant in time, the eccentrically mounted weights 80 and 81 on full-speed shafts 28 and 32 and the eccentrically mounted weights 82 and 83 on half-speed shafts 21 and 22 are all oriented in the same direction pointing opposite the direction of conveyance. Under such circumstances, the resultant force at the instant of time shown in FIG. 9 will be the sum of the force produced by both the weights 82, 83 and weights 80, 81, in a direction opposite the direction of conveyance.

A 90° rotation of half-speed shafts 21 and 22 will result in a 180° rotation of full-speed shafts 28 and 32. Under such conditions, weights 82 and 83 align in vertically opposing orientation, and produce no force in the direction of conveyance, leaving only a less significant force in such direction produced by weights 80, 81.

An additional 90° rotation of half-speed shafts 21 and 22 in the same direction results in another 180° rotation of full-speed shafts 28 and 32. Weights 82, 83 are then aligned in the direction of conveyance, and weights 80, 81 are aligned in a direction opposite the direction of conveyance, thereby canceling the force of weights 82, 83 to produce virtually no net resultant force in the direction of conveyance.

Another 90° rotation of half-speed shafts 21 and 22 in the same direction will again result in another 180° rotation of full-speed shafts 28 and 32. Under such conditions, weights 82, 83 are again aligned in opposing vertical orientation and produce no force along the path of conveyance, while weights 80, 81 are once again aligned in the direction of conveyance, thereby producing a less significant force in the direction of conveyance. One further 90° rotation of half-speed shafts 21 and 22 in the same direction will complete the revolutionary cycle and cause all weights to realign in the direction opposite the direction of conveyance, thereby beginning a new cycle.

As can be seen from the above illustration, through one cycle of rotation of half-speed shafts 21 and 22, there is a relatively short but strong force applied to the material-conveying member 10 in the direction opposite the direction of conveyance, followed by a series of relatively less significant forces applied to the material-conveying member 10 in the direction of desired conveyance. The short large force will effectively cause the material being conveyed to slip forwardly on the material-conveying member 10, while the less significant forces over the remainder of the cycle will move the conveyor 10 in the desired direction of conveyance. Thus, as can be seen, by rotating the full-speed shafts 21 and 22 at a speed twice that of the half-speed shafts 28 and 32, the desired slow-advance/quick-return conveyor stroke is produced. Since the relative angular relationship of weights 82 and 83 remain constant to one another, and the same relationship is true with respect to weights 80 and 81, the slow-advance/quick-return conveyor stroke is substantially devoid of any components of force directed normal to the desired path of conveyance.

Other than the above-mentioned positional relationships between the eccentrically mounted weights on the full-speed and half-speed shafts, unlike the conventional conveyors described previously, it is the specific purpose of the instant invention to be capable of altering the angular position of the weights 80, 81 relative to the angular position of the weights 82, 83 while the conveying operation is taking place. There is a need for the capability, to enable the operator of the conveyor to change the phase relationship in order to change the conveying speed when, for example, a change in production rate occurs. Such angular displacement or phase differential between the weights 80, 81 and weights 82, 83 facilitates alteration of the application of vibratory force to the material-conveying member 10, without changing the direction of the line of the resultant vibratory force imparted thereto. Also, by changing the angular displacement or phase differential during operation of the conveyor, the operator can observe the effects of such changes upon the product, and can select the optimum speed to minimize noise, damage to the product, and to optimize product conveying velocity and bed depth to meet production needs.

Figure 10:
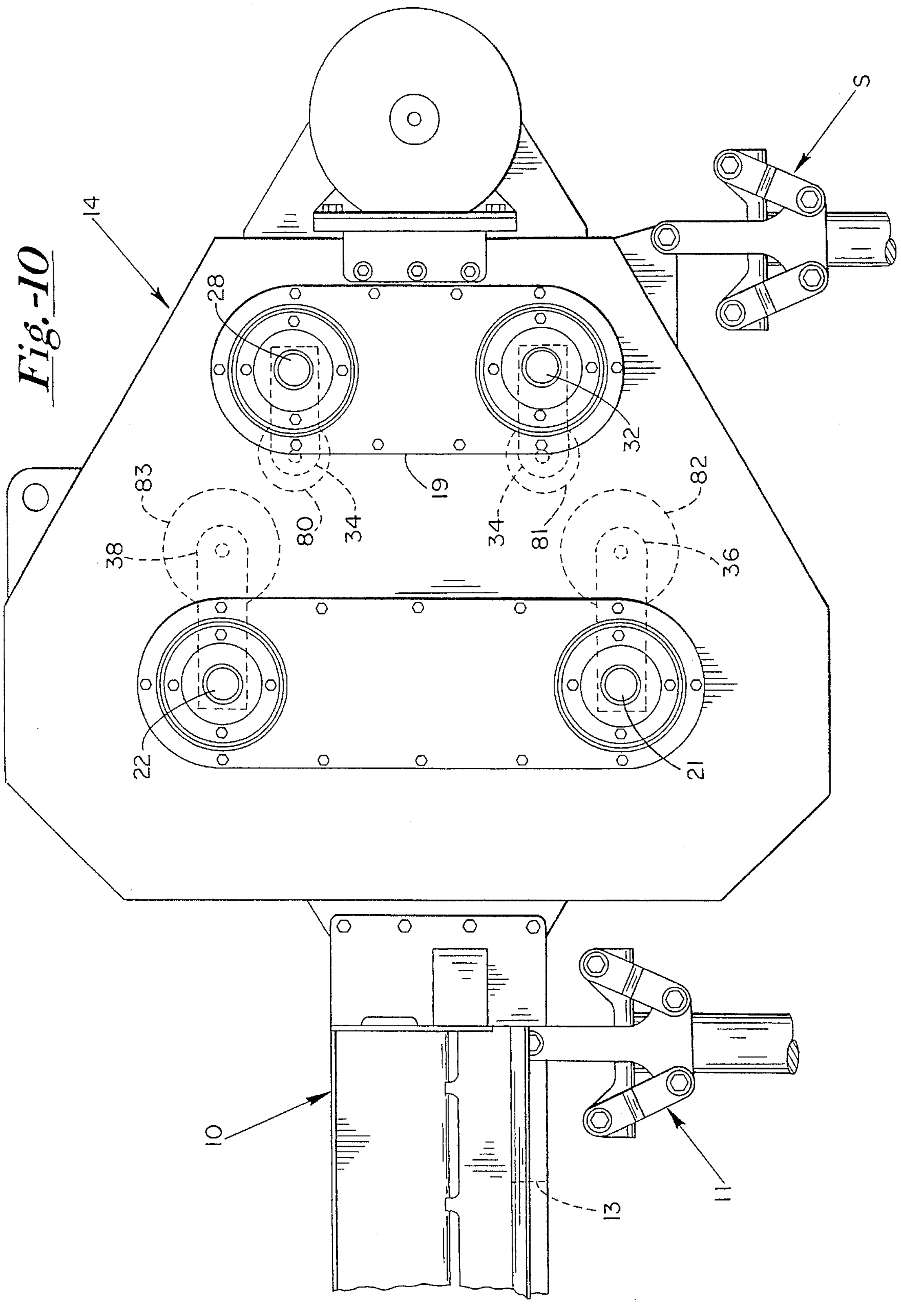
FIG. 10 is another side-elevational view of the conveyor vibrating mechanism, where the full-speed weights have been angularly displaced 180° relative to their orientation in FIG. 9.
Figure 11A:
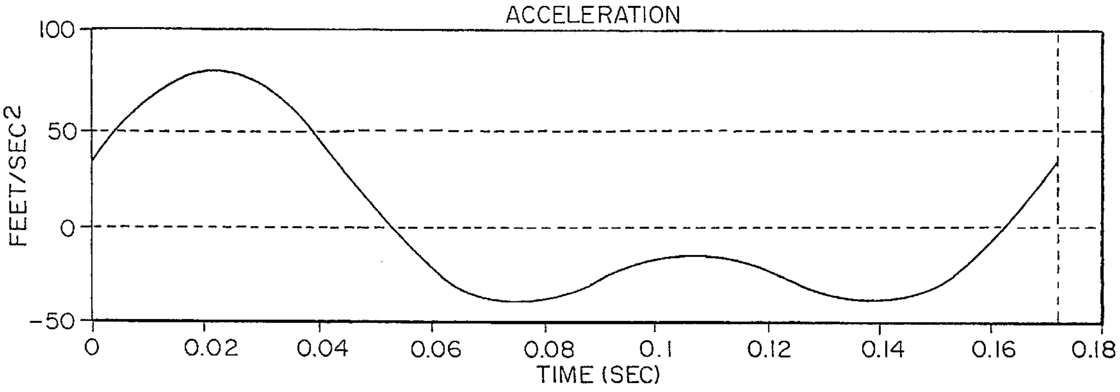
FIG. 11A is a plotted graph representing the acceleration of a material-conveying member over one revolutionary cycle, where the half-speed and full-speed weights of the vibration generating means are oriented as shown in FIG. 9.
Figure 11B:
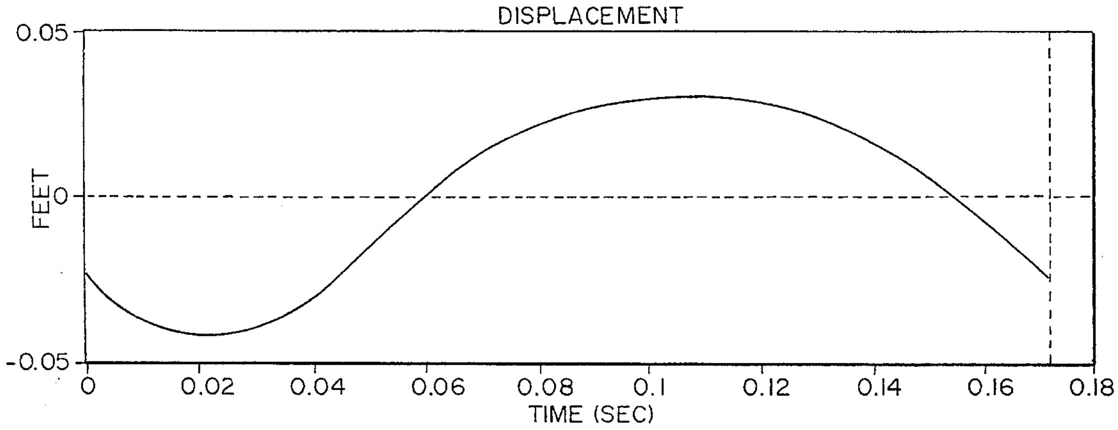
FIG. 11B is a plotted graph of the displacement of a material-conveying member over one revolutionary cycle, where the half-speed and full-speed weights of the vibration-generating means are oriented as depicted in FIG. 9.
Figure 12A:
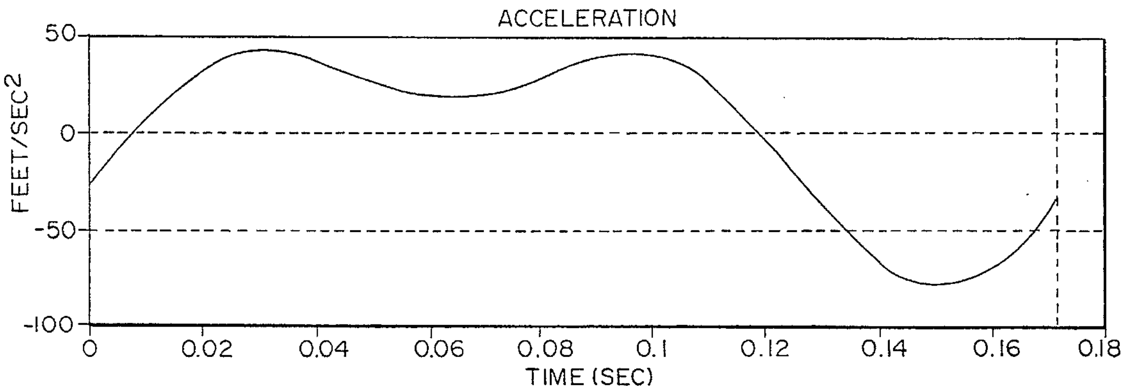
FIG. 12A is a plotted graph of the acceleration of the material-conveying member over one revolutionary cycle, where the half-speed and full-speed weights of the vibration-generating means are oriented as depicted in FIG. 10.
Figure 12B:
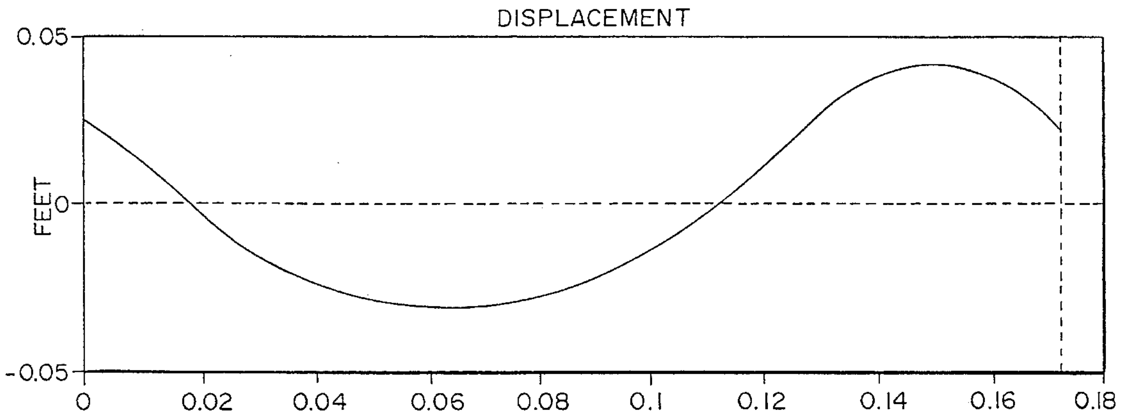
FIG. 12B is a plotted graph of the displacement of the material-conveying member over one revolutionary cycle, where the half-speed and full-speed weights of the vibration-generating means are oriented as depicted in FIG. 10.

To illustrate the operation and usefulness of our single drive conveyor system with its phase-adjustment/motion-altering mechanism 50, reference is made to FIGS. 11A through 12B. FIGS. 11A and 11B are plotted graphs of the acceleration and displacement transfer functions over one revolutionary cycle for a set of weights 82, 83 and weights 80, 81, oriented as shown in FIG. 9. FIGS. 12A and 12B are plotted graphs of the acceleration and displacement transfer functions over one revolutionary cycle of a set of weights 82, 83 and weights 80, 81, oriented as shown in FIG. 10, where weights 80, 81 have been displaced angularly 180° relative to weights 82, 83 via the use of phase-adjustment/motion-altering mechanism 50.

For purposes of illustration in FIGS. 11A through 12B, a conveyor system with a rotating speed of 350 RPM on the half-speed shafts 21, 22, and a speed of 700 RPM on the full-speed shafts 28, 32, has been chosen. Also, weights 82, 83 have been chosen to have a mass that will produce a maximum resultant combined force which is 1.5 times the maximum resultant combined force produced by weights 80, 81. The total conveyor stroke will be restricted to approximately one inch.

Under the above conditions, as shown in FIG. 11A, through one complete revolution of half-speed shafts 21 and 22 (two revolutions for full-speed shafts 28 and 32), the acceleration of material-conveying member 10 peaks in one direction at about 80 ft/sec$^2$ shortly after 0.02 seconds (corresponding to the position of weights in FIG. 9). The material-conveying member 10 thereafter decelerates and begins accelerating in the opposite direction at about 0.05 seconds. During the period of time from about 0.05 seconds to approximately 0.16 seconds, the material-conveying member continues to accelerate at a variably reduced level (a maximum of about 41 ft/sec$^2$) in the opposite direction of its initial acceleration, and thereafter again decelerates and begins accelerating in the initial direction upon beginning a new cycle. Note that the initial acceleration is much stronger over a shorter period of time than the subsequent acceleration in the opposite direction, giving rise to the desired slow-advance/quick-return conveyor stroke.

As can be seen in FIG. 11B, the graph of the corresponding displacement transfer function shows the displacement of material-conveying member 10 over a corresponding period of time covering a single conveyor stroke. As can be seen from the graph in FIG. 11B, from rest, the material-conveying member 10 is initially displaced rapidly in one direction a distance of approximately 0.042 feet (0.5 inches), and then reverses and begins a rather slow and gradual movement to a maximum displacement in the opposite direction of about 0.03 feet (0.36 inches), where it then begins another rapid movement in the initial direction. The total displacement or conveyor stroke of the material-conveying member 10 is approximately 0.86 inches, which approaches the desired preselected limit of approximately 1 inch. Such rapid movement in one direction, and rather slow advance in the opposite direction, provides the desired slow-advance/quick-return conveyor stroke which is desired to convey product with vibratory forces which are directed substantially only along the desired path of conveyance, without introducing vibratory forces in a direction normal thereto.

It should be noted that a product which has a friction coefficient of about 0.4 to 0.5 will stick to the conveyor member 10 and move therewith when the acceleration of the material-conveying member 10 is less than about 15 ft/sec$^2$, and the product will slip on the material-conveying member 10 for accelerations which exceed about 15 ft/sec$^2$. Therefore, with reference to FIG. 11A, it can be seen that the product will slip upon movement of the material-conveying member 10 in the direction of the upward acceleration peak of about 80 ft/sec$^2$, and the product will convey as it is accelerated in the direction of the downward peaks, during those portions of the curve when the acceleration is less than about 15 ft/sec$^2$. This coincides with the disclosure in FIG. 11B where the initial displacement of the material-conveying member 10 in one direction is rapid, causing the product to slip, and thereafter enters a relatively slow period of advance wherein the product will move with material-conveying member 10.

Under the conditions shown in FIG. 10, where the full-speed weights 80, 81 have been angularly displaced 180° relative to their positions depicted in FIG. 9, via the control of phase-adjustment/motion-altering mechanism 50, the direction of conveyance will reverse. As can be seen in FIGS. 12A and 12B, with the half-speed and full-speed weights oriented as shown in FIG. 10, the plotted waveforms of the acceleration and displacement of the material-conveying member 10 are essentially inverted from those waveforms shown in FIGS. 11A and 11B. Thus, the period of rapid acceleration and displacement of material-conveying member 10 has reversed direction, as has the more slower and gradual period of acceleration and displacement. It is, therefore, readily apparent that the application of vibratory force to the material-conveying member 10 has been altered through the use of phase-adjustment/motion-altering mechanism 50 to effectively reverse the acceleration and displacement characteristics of the material-conveying member 10. Consequently, the relative movement of material-conveying member 10 is effectively reversed, as is the conveyance of the product carried thereby.

It should be understood that the above exemplary conditions showing the results of a 180° angular displacement from one nominal set of angular positions of the respective full-speed and half-speed weights shown in FIG. 9 to a second set of relative angular positions shown in FIG. 10 only illustrates one conceivable alteration in the application of vibratory force. The phase-adjustment/motion-altering mechanism 50 can be activated to re-position pulleys 59 and 60 at any time during operation of the conveyor, thereby altering the lengths of belt continuums 77 and 78 to effect a new angular displacement between the respective full-speed and half-speed weights.

Figure 13A:
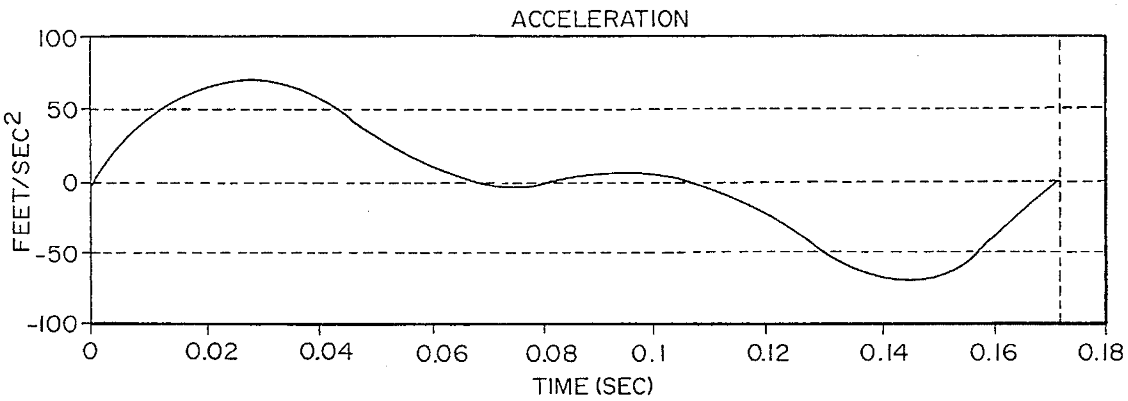
FIG. 13A is a plotted graph of the acceleration of the material-conveying member over one revolutionary cycle, where the half-speed and full-speed weights are angularly displaced in such orientation as to produce no net product conveyance.
Figure 13B:
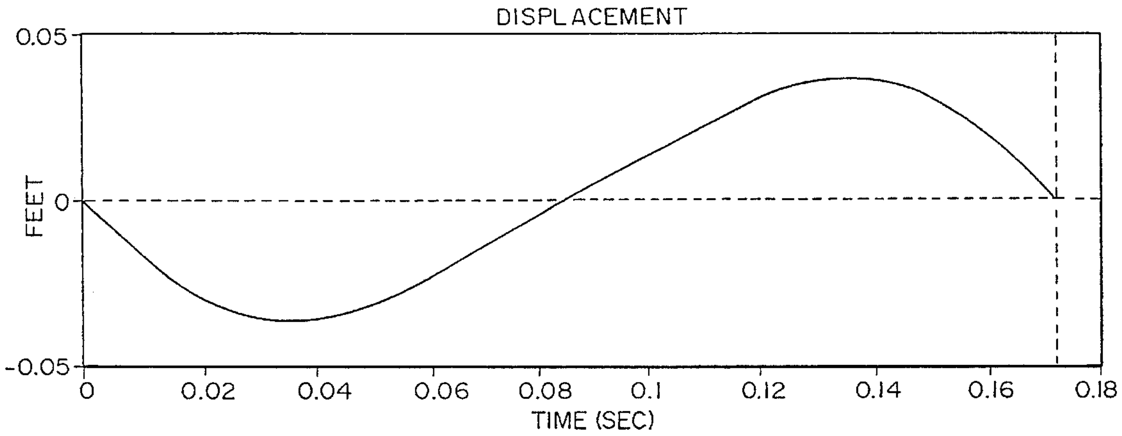
FIG. 13B is a plotted graph of the displacement of the material-conveying member over one revolutionary cycle, where the half-speed and full-speed weights are angularly displaced in such orientation as to produce no net product conveyance.

For instance, activating phase-adjustment/motion-altering mechanism 50 to cause an angular displacement of 90° from an initial nominal orientation, as shown in FIG. 9, will produce a new application of vibratory force that will cause material-conveying member 10 to oscillate symmetrically about its initial position of rest, with no net conveyance in either direction. As shown in FIGS. 13A and 13B, under such circumstances, the acceleration and displacement waveforms are symmetrical about the origin and the middle of the cycle, thereby producing no net conveyance, and effectively reducing the conveyance speed to zero. With the full-speed weights 80, 81 and half-speed weights 82, 83 in such orientation, increasing the relative angular displacement slightly will cause conveyance to begin in one direction, while decreasing the relative angular displacement will cause conveyance to begin in the opposite direction. Of course, numerous other target angular displacements may be selected between the above illustrated cases to give rise to varying applications of vibratory force, and consequently varying speeds of product conveyance.

Figure 14:
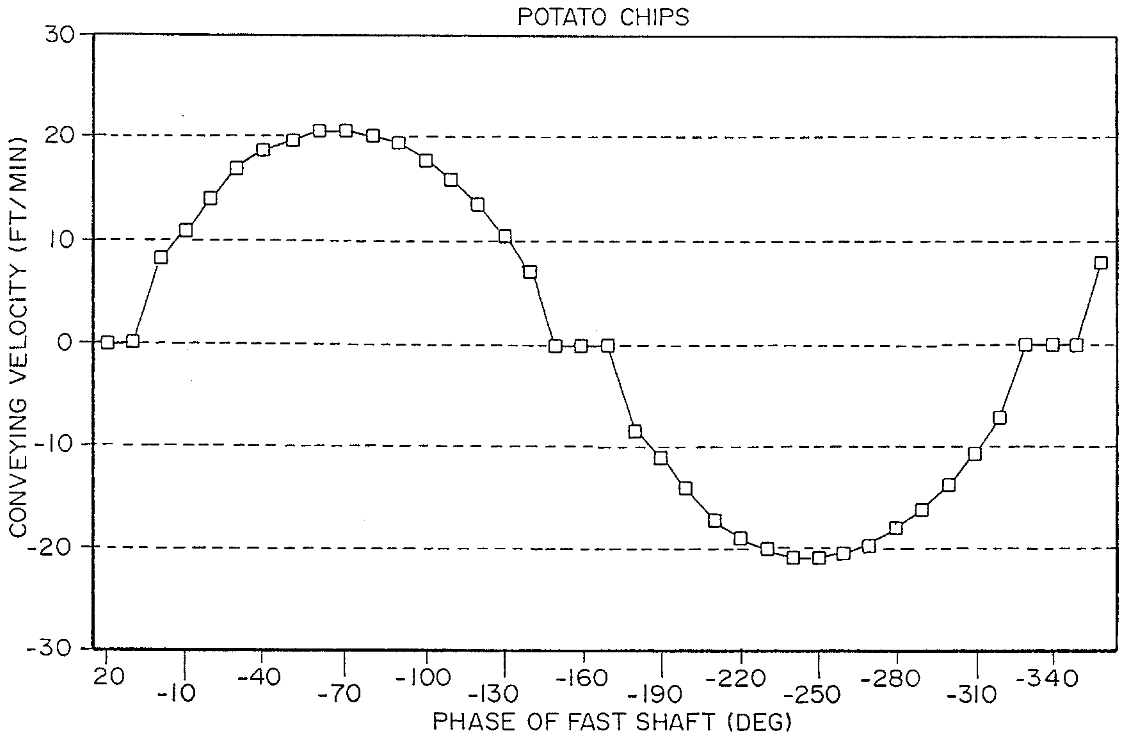
FIG. 14 is a plotted graph of the conveying velocity of an exemplary product (potato chips) over one revolutionary cycle of changes in the relative angular displacement of the full-speed shaft of the vibration-generating mechanism at a particular drive speed.

FIG. 14 pertains to an exemplary potato chip product, which is a good example of a fragile product, in which the greatest speed may not be the optimum speed. It shows a plotted graph of the conveying velocity of potato chips over one revolutionary cycle of change in the relative angular displacement between the half and full speed shafts at a particular drive speed. As shown, it indicates the measured conveying velocity versus the phase relationship between the fast, weighted full-speed shafts 28, 32 and the slow, weighted half-speed shafts 21, 22. It will be seen that the phase relationship of approximately 360 degrees is identical to that of zero (0) degrees. The data for this produces a rather smooth curve which is almost like a sine curve. Not all products produce such a smooth curve.

Figure 15:
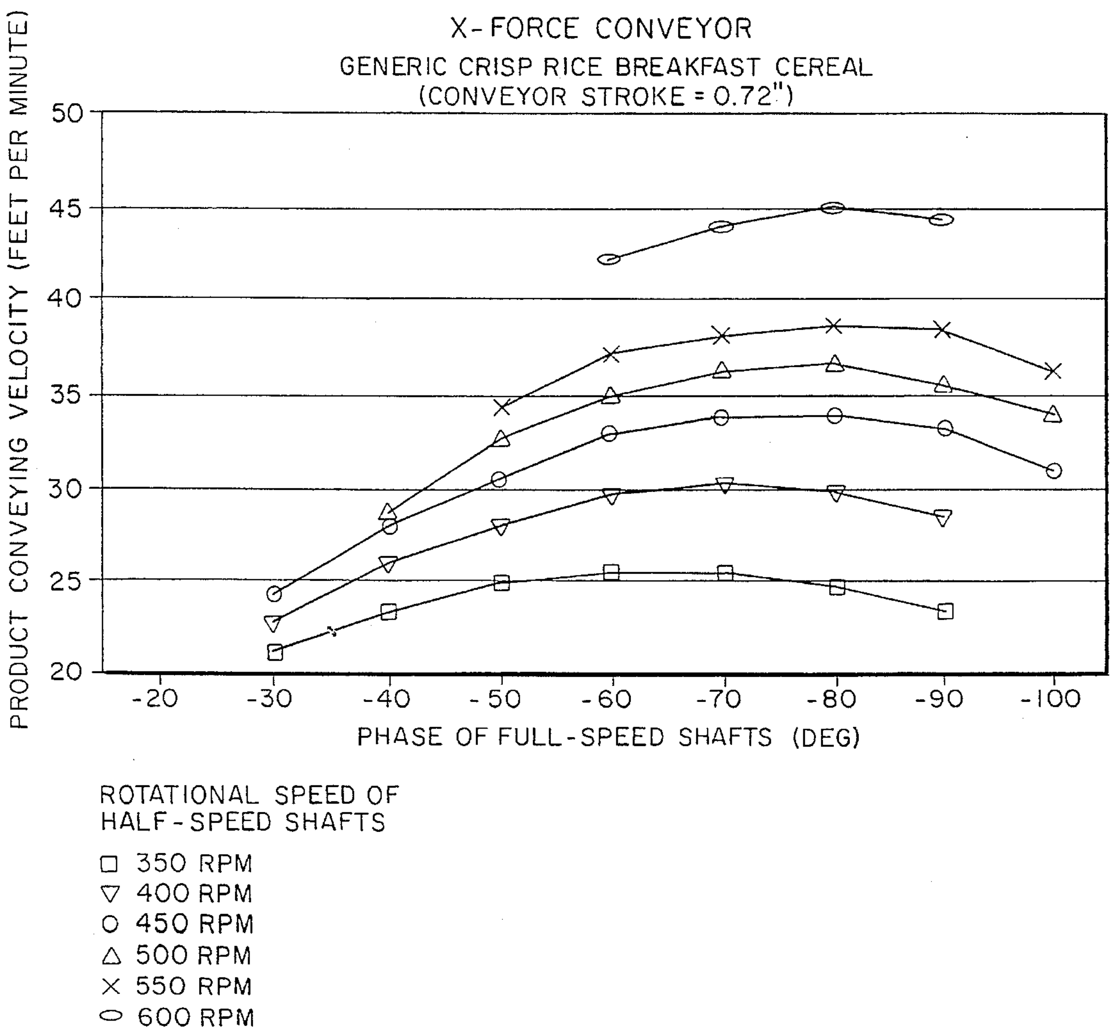
FIG. 15 is a graph showing the measured product conveying velocities versus the negative phase differential of the full-speed shafts for a crisp rice breakfast cereal product at different rotational speeds of the half-speed shafts.

It should also be noted that changing the rotational speed of the eccentrically weighted shafts 21, 22, 28 and 32 may cause the maximum product conveying velocity to occur at a different phase differential between the half-speed and full-speed shafts. A graph showing the measured product conveying velocities versus the negative phase differential of the full-speed shafts for a crisp rice breakfast cereal product at different rotational speeds of the half-speed shafts is shown in FIG. 15. As can be seen therein, maximum product conveyance speed for a generic crisp rice breakfast cereal occurs at a phase differential of approximately −60 degrees when the half-speed shafts are rotating at 350 RPM, but shifts to approximately −80 degrees when the half-speed shafts rotate at 600 RPM. It should be noted that for this product, and for most products generally, the maximum conveying velocity occurs at an increased negative phase differential as the conveyor rotational speed increases.

Some conveyors may be equipped with a variable speed drive as well as the phase-adjustment/motion-altering mechanism of the invention herein, which will allow adjustment of both phase differential and rotational speeds to arrive at the optimal product conveyance speed. As the rotational speeds of the half-speed and full-speed shafts are increased, the centrifugal forces they generate are also increased, and there is a practical design high speed limit for the vibration-generating mechanism.

By adjusting the relative angular positions of the half-speed weights 82, 83 relative to the full-speed weights 80, 81, the operator of our single drive conveyor system is able to change the application of vibratory force to the material-conveying member 10, during operation thereof, consequently changing the speed and/or direction of conveyance, without introducing undesirable vibratory forces in a direction normal to the desired path of conveyance. As previously indicated, this represents a distinct advantage over conventional conveyor systems which necessarily require a change in the angle of incidence of the resultant line of vibratory force in order to change the speed or direction of conveyance. Moreover, the operator can accomplish such changes while the conveyor is in operation and can observe the results of such changes while it is operating, so as to make further adjustments, if needed.

Through use of our single drive conveyor system with phase-adjustment/motion-altering mechanism, it is possible to determine, during the operation of the conveyor 10, the optimal application of vibratory force which produces the best conveyance speed for a given material which is to be conveyed. Through the use of phase-adjustment/motion-altering mechanism 50, an operator may adjust the angular displacement of half-speed weights 82, 83 relative to full-speed weights 80, 81 and observe, monitor and maintain the conveyance speed of the material relative to the selected angular displacement via the use of sensor 79. The operator may then change the relative angular displacement between half-speed weights 82, 83 and full-speed weights 80, 81 with phase-adjustment/motion-altering mechanism 50 and repeat the above process until the above optimal speed of conveyance is determined. From the above, it can be readily determined what desired angular displacement at which a given conveyor must be set, in order to provide the necessary application of vibratory force to effect optimal conveyance of the particular selected material. It is noted, of course, that the optimal speed for any one given material depends upon the physical properties thereof, and may not necessarily be the fastest speed at which the material can be conveyed.

It will, of course, be understood that various changes may be made in the form, details, arrangement and proportions of the parts without departing from the scope of the invention which comprises the matter shown and described herein and set forth in the appended claims.

We claim:

1. Single drive conveyor apparatus with phase-adjustment/motion-altering control for adjusting the application of vibratory forces to the conveyor motion without changing the direction of the resultant line of vibratory force generated thereby, comprising:

a) an elongated material-conveying member having a longitudinal centroidal axis;

b) a vibration-generating means connected to said material-conveying member for transmitting vibratory forces to said material-conveying member substantially only in a direction parallel with said longitudinal centroidal axis of said material-conveying member;

c) said vibration-generating means including two pairs of parallel rotatable vibration-generating eccentrically weighted shafts; and d) phase-adjustment/motion-altering mechanism connected to said two pairs of vibration-generating shafts, said mechanism being shiftable relative to said shafts to cause one pair of said shafts to change its angular position relative to the other of said pairs to thereby controllably vary the application of vibratory forces to the conveyor motion of said material-conveying member by said vibration-generating means without changing the direction of the resultant line of said resultant force.

2. The single drive conveyor apparatus defined in claim 1, wherein said material-conveying member has opposite ends, and said vibration-generating means is connected to said member at one of said ends in driving relation to said member.

3. The single drive conveyor apparatus defined in claim 1, wherein said vibration-generating means is connected to said material-conveying member at the longitudinal centroidal axis of said member.

4. The single drive conveyor apparatus defined in claim 1, wherein said phase-adjustment/motion-altering mechanism is shiftable relative to said weighted shafts as said shafts rotate.

5. The single drive conveyor apparatus defined in claim 1, wherein said shiftable phase-adjustment/motion-altering mechanism causes each pair of said shafts to change its angular relation to the other pair of said shafts, when said mechanism shifts.

6. The single drive conveyor apparatus defined in claim 1, wherein said shiftable phase-adjustment/motion-altering mechanism causes each shaft of one pair of said shafts to change its angular relation to at least one of the shafts of the other pair of said vibration-generating shafts, when said mechanism shifts.

7. The single drive conveyor apparatus defined in claim 1, wherein said shafts are driven by a single continuous flexible driving element.

8. The single drive conveyor apparatus defined in claim 1, wherein the two shafts of each of said pairs of weighted shafts rotate in opposite directions to each other and at equal speeds.

9. The single drive conveyor apparatus defined in claim 1, wherein one of said pairs of shafts rotate at a speed twice the speed of the other pair of said shafts.

10. The single drive conveyor apparatus defined in claim 1, wherein the shafts of the first of said pairs of vibration-generating shafts carry eccentrically mounted weights of equal mass, and the shafts of the other of said pairs of vibration-generating shafts carry eccentrically mounted weights of equal mass which have a mass value different from that of the weights carried by said first pair of shafts.

11. The single drive conveyor apparatus defined in claim 1, wherein the shafts of said two pairs of weighted shafts each carry weights which generate equal forces.

12. The single drive conveyor apparatus defined in claim 1, wherein said phase-adjustment/motion-altering mechanism is positioned between said two pairs of vibration-generating shafts and varies the relative angular positions therebetween as it shifts.

13. The single drive conveyor apparatus defined in claim 1, wherein said phase-adjustment/motion-altering mechanism is non-pivoted in its shifting movement.

14. The single drive conveyor apparatus defined in claim 1, wherein said phase-adjustment/motion-altering mechanism is shiftable only along a straight line.

15. The single drive conveyor apparatus defined in claim 14, wherein one pair of said vibration-generating shafts is rotated at twice the speed of the other pair of said shafts.

16. The single drive conveyor apparatus defined in claim 1, and drive mechanism connected in driving relation to said phase-adjustment/motion-altering mechanism for controllably shifting the same.

17. The single drive conveyor apparatus defined in claim 1, wherein said pairs of vibration-generating shafts are positioned along two spaced lines and said vibration-altering mechanism shifts along a line disposed between said two spaced lines.

18. In vibrating conveyor apparatus having an elongated generally horizontal trough with a longitudinal centroidal axis and an inlet end and a discharge end, means supporting said trough for motion only substantially along a straight line, vibration-generating mechanism connected to said trough in driving relation, said vibration-generating mechanism including, two pair of vibration-generating shafts mounted parallel to each other immediately adjacent to and transversely of said trough;

each of said pairs of shafts having one shaft mounted above, and the other below, said longitudinal centroidal axis;

a motor connected to said shafts in driving relation;

one of said pairs of shafts being half-speed shafts having equal diameter half-speed pulleys driven by said motor and weights eccentrically mounted thereon which generate substantially equal opposing forces in a direction normal to said longitudinal axis of said trough;

the other of said pair of shafts being full-speed shafts and having equal diametered pulleys, each of which have diameters one half the diameter of said half-speed pulleys;

said full-speed shafts having weights eccentrically mounted thereon which generate substantially equal opposing forces in a direction normal to said longitudinal axis of said trough;

a timing belt drivingly connected to one side of one of said half-speed pulleys and to the other side of the other of said half-speed pulleys, and being driven by said motor;

said driving belt being also drivingly connected to one side of one of said full-speed pulleys and then drivingly connected to the other side of the other of said full-speed pulleys;

said pulleys being oriented relative to each other such that at one instant of time in each revolution of said half-speed pulleys said shafts will have an initial position such that said weights on all four of said pulleys will be directed in one common direction along said longitudinal centroidal axis of said trough to provide a combined maximum force along said axis directed away from the said discharge end, and such that said timing belt will turn said half-speed pulleys in opposite directions whereby a 90° turn of said half-speed pulleys and shafts will cancel the force of said half-speed shafts and will cause said two full-speed shafts to rotate 180° to thereby generate a lesser force in a direction along said axis opposite to the direction of said combined maximum force, a further 90° turn of said half-speed shafts will rotate said full-speed shafts 360° from the initial position of said full-speed shafts and thereby cancel substantially all forces along said axis, a further 90° turn of said half-speed shafts will again cancel the force of the said half-speed shafts and will cause said two full-speed shafts to rotate 540° from the initial position to thereby generate a single force lesser than said maximum force in a direction along said axis opposite to the direction of said combined maximum force, and a final further 90° turn of said half-speed shafts will rotate said half-speed shafts to a position 360° from said initial position and said full-speed shafts to a position 720° from said initial position to thereby generate a combined maximum force in the same direction as the initial combined maximum force along said longitudinal axis whereby material on said trough will be shuffled longitudinally on said trough toward said discharge end; and phase-adjustment/motion-altering mechanism connected to and disposed between said two pairs of vibration-generating shafts;

said phase-adjustment/motion-altering mechanism being shiftable relative to said shafts to cause one pair of said shafts to change its angular position relative to the other of said pairs, to thereby controllably vary the application of vibrating forces to the conveyor motion of said material-conveying member by said vibration-generating mechanism without changing the direction of the resultant line of the resultant force.

19. The vibrating conveyor apparatus defined in claim 18, wherein said vibration-generating mechanism is connected to one of said ends in driving relation to said member.

20. The vibrating conveyor apparatus defined in claim 18, wherein said vibration-generating mechanism is connected to said material-conveying member at the longitudinal centroidal axis of said member.

21. The vibrating conveyor apparatus defined in claim 18, wherein said phase-adjustment/motion-altering mechanism causes each shaft of each pair of said shafts to change its angular relation to each of the shafts of the other pair of said shafts when said vibration-altering mechanism shifts.

22. Single drive conveyor apparatus with phase/motion control for adjusting the application of vibratory forces to the conveyor motion without changing the direction of the resultant line of vibratory force generated thereby, comprising:

an elongated material-conveying member having a longitudinal centroidal axis;

a vibration-generating mechanism connected to said material-conveying member for transmitting vibratory forces to said material-conveying member substantially only in a direction substantially parallel to and substantially co-axial with said longitudinal centroidal axis of said material-conveying member, said vibration-generating mechanism further comprising:

(a) a drive motor drivingly connected to a first pair of opposing parallel counter-rotating vibrator shafts which rotate at a predetermined speed and are symmetrically positioned and disposed transversely relative to said longitudinal centroidal axis of said material-conveying member, each of said vibrator shafts carrying at least one eccentrically mounted weight for rotation therewith, each said eccentrically mounted weight on each of said first pair of vibrator shafts having a corresponding eccentrically mounted weight which generates an equal force carried by its opposing vibrating shaft, each said eccentric weight and its corresponding eccentric weight carried by said opposing first pair of vibrator shafts being positioned such that the resultant vibratory force produced through simultaneous counter-rotation thereof is substantially devoid of any component of force in a direction normal to said longitudinal centroidal axis of said material-conveying member;

(b) a second pair of opposite counter-rotating vibrator shafts driven by said motor and which rotate normally at a speed of twice the speed of said first vibrator shafts and are symmetrically positioned and transversely disposed relative to said longitudinal centroidal axis of said material-conveying member, each of said second pair of vibrator shafts carrying at least one eccentrically mounted weight for rotation therewith, each said eccentrically mounted weight on each of said second vibrator shafts having a corresponding eccentrically mounted weight which generates a force equal to that generated by the other weight on said opposing second vibrator shaft, each said eccentric weight and corresponding eccentric weight carried by said opposing second vibrator shafts being positioned such that the resultant vibratory force produced thereby through simultaneous counter-rotation thereof is substantially devoid of any component of force in a direction normal to said longitudinal centroidal axis of said material-conveying member;

(c) said eccentric weights carried by said second pair of vibrator shafts and said eccentric weights carried by said first pair of vibrator shafts having a predetermined relative angular positional displacement; and (d) phase-adjustment/motion-altering mechanism connected to said two pairs of vibrator shafts, said mechanism being shiftable relative to said shafts as they rotate to cause one pair of said shafts to change its angular position relative to the other of said pairs, to thereby controllably vary said predetermined relative angular positional displacement at any time during the operation of the conveyor apparatus to thereby provide for modification of the application of vibratory forces to the conveyor motion during operation without changing the direction of the resultant line of vibratory force of the conveyor apparatus.

23. The single drive conveyor apparatus defined in claim 22, wherein said material-conveying member has opposite ends and said phase-adjustment/motion-altering mechanism is connected thereto at one of said ends.

24. Single drive conveyor apparatus with phase/motion control for adjusting the application of vibratory forces to the conveyor motion without changing the direction of the resultant line of vibratory force generated thereby, comprising:

(a) an elongated material-conveying member having a longitudinal centroidal axis;

(b) a vibration-generating means connected to said material-conveying member for transmitting vibratory forces to said material-conveying member substantially only in a direction parallel with said longitudinal centroidal axis of said material-conveying member;

(c) said vibration-generating means including two pairs of parallel rotatable vibration-generating shafts, each shaft of each of said pairs carrying an eccentric weight generating a force equal to that generated by the eccentric weight carried by the other shaft of said pair and rotating in a direction opposite to the direction of rotation of the other shaft of said pair and at an equal speed;

(d) said vibration-generating means having one of said pairs of vibration-generating shafts rotating at a speed of twice the speed of rotation of the other of said pairs and carrying eccentrically positioned weights which generate forces different in value from the forces generated by the weights of the other of said pairs; and (e) phase-adjustment/motion-altering mechanism connected to said two pairs of vibration-generating shafts, said mechanism being shiftable relative to said shafts to cause one pair of said shafts to change its angular position relative to that of the other of said pairs to thereby controllably vary the application of vibratory forces to said material-conveying member by said vibration-generating means without changing the direction of the resultant line of the resultant force.

25. The single drive conveyor apparatus defined in claim 24, wherein said material conveying member has opposite ends and said vibration-generating means is connected to said member at one of said ends in driving relation to said member.

26. The single drive conveyor apparatus defined in claim 24, wherein said vibration-generating means is connected to said material-conveying member at the longitudinally centroidal axis of said member.

27. The single drive conveyor apparatus defined in claim 24, wherein said phase-adjustment/motion-altering mechanism is shiftable relative to said weighted shafts as said shafts rotate.

28. The single drive conveyor apparatus defined in claim 24, wherein said shiftable phase-adjustment/motion-altering mechanism causes each shaft of each pair of said shafts to change its angular relation to each of the shafts of the other pair of said shafts when said mechanism shifts.

29. The single drive conveyor apparatus defined in claim 24, wherein said shiftable phase-adjustment/motion-altering mechanism causes each shaft of one pair of said shafts to change its angular relation to at least one of the shafts of the other pair of said vibration-generating shafts, when said mechanism shifts.

30. The single drive conveyor apparatus defined in claim 24, wherein said shafts are driven by a single continuous flexible driving element.

31. The single drive conveyor apparatus defined in claim 24, wherein said phase-adjustment/motion-altering mechanism is positioned between said two pairs of vibration-generating shafts and varies the relative angular positions therebetween as it shifts.

32. The single drive conveyor apparatus defined in claim 24, wherein said phase-adjustment/motion-altering mechanism is non-pivoted in its shifting movement.

33. The single drive conveyor apparatus defined in claim 24, wherein said phase-adjustment/motion-altering mechanism is shiftable only along a straight line.

34. The single drive conveyor apparatus defined in claim 24, wherein said pairs of vibration-generating shafts are positioned along two spaced lines and said phase-adjustment/motion-altering mechanism shifts along a line disposed between said two spaced lines.

35. The single drive conveyor apparatus defined in claim 30, wherein said continuous flexible driving element has an upper continuum extending in driving relation between one shaft of each of said pairs of vibration-generating shafts and has a lower continuum extending in driving relation between the other shaft of each of said pairs of vibration-generating shafts and said phase-adjustment/motion-altering mechanism engages each of said upper and lower continuums and simultaneously shortens one of them while lengthening the other as said phase-adjustment/motion-altering mechanism shifts.

36. The single drive conveyor apparatus defined in claim 30, wherein said continuous flexible driving element has a pair of opposed continuums, one of which extends in driving relation between one shaft of each of said pairs of vibration-generating shafts and the other of which extends in driving relation between the other shaft of each of said pairs of vibration-generating shafts, said phase-adjustment/motion-altering mechanism including a pair of pulleys mounted for rotation about a pair of spaced axes and each engaging a different one of said continuums, said pulleys being shiftable along a straight line while maintaining said spaced relation to thereby shorten one of said continuums while simultaneously lengthening the other and thereby altering the axial displacement between said pairs of shafts.

37. The single drive conveyor apparatus defined in claim 30, wherein said continuous flexible driving element has a pair of opposed continuums, one of which extends in driving relation between one shaft of each of said pairs of vibration-generating shafts and the other of which extends in driving relation between the other shaft of each of said pairs of vibration-generating shafts, said phase-adjustment/motion-altering mechanism including a pair of idler pulleys mounted for rotation about a pair of spaced axes and each engaging a different one of said continuums, said pulleys being shiftable while maintaining said spaced relation to thereby shorten one of said continuums while simultaneously lengthening the other of said continuums to thereby alter the axial displacement between said pairs of shafts, and power means controllably connected to said pulleys in shift-controlling relation.

38. A method of determining the optimal application of vibratory force to obtain optimal conveyance speed for a given material which is being conveyed on a conveyor apparatus in which the direction of the resultant line of vibratory force generated is substantially only parallel with the longitudinal centroidal axis of the material-conveying member of the conveyor apparatus, comprising the steps of:

(a) providing a conveyor apparatus having an elongated material-conveying member with a longitudinal centroidal axis, and a single drive vibration-generating means connected to said material-conveying member for transmitting vibratory forces to said material-conveying member substantially only in a direction parallel with said longitudinal centroidal axis of said material-conveying member, said vibration-generating means including a first pair of vibrator shafts which carry oppositely positioned, eccentrically mounted weights that generate substantially equal opposing forces in a direction normal to said longitudinal centroidal axis of said material-conveying member, and a second pair of vibrator shafts which carry oppositely positioned, eccentrically mounted weights that generate substantially equal opposing forces in a direction normal to said longitudinal centroidal axis of said material-conveying member, said second pair of vibrator shafts normally rotating at an average speed which is a predetermined ratio of the speed of said first vibrator shafts;

(b) selecting and setting said eccentric weights carried by said second pair of vibrator shafts at a predetermined nominal angular position relative to said eccentric weights carried by said first pair of vibrator shafts to define a relative angular displacement therebetween;

(c) loading said material-conveying member with the desired material to be conveyed thereby;

(d) activating said vibration-generating means to convey the material on said material-conveying member at an initial conveyance speed;

(e) observing the effect upon the material being conveyed as it is so conveyed at such speed of conveyance;

(f) changing, during the conveying operation, the angular position of said eccentric weights carried by said second vibrator shafts relative to the angular position of said eccentric weights carried by said first vibrator shafts an amount estimated to change the speed of conveyance so as to more closely approach the optimal speed of conveyance; and (g) Repeating steps (e) through (f) until a desired optimal conveyance speed for said material being conveyed is observed.

39. The method defined in claim 38, wherein the selecting and setting of said eccentric weights carried by said second pair of vibrator shafts as defined in step (b) effects the definition of an initial target angular displacement and is effected in accordance with an approximation by the operator of the relative angular displacement of the shafts required to provide an optimal conveyance speed.

40. The method defined in claim 38 wherein the step of providing a conveyor apparatus includes providing a powered single drive belt having an upper continuum and a lower continuum and which is connected in driving relation to said shafts, and wherein the changes effected in step (f) are accomplished by lengthening one continuum of said belt while shortening the other continuum thereof.

41. The method defined in claim 40 wherein the step of providing conveyor apparatus includes providing phase-adjustment/motion-altering means which includes a pair of pulleys mounted in fixed spaced relation and being shiftable together, with one of said pulleys being in engagement with the upper continuum of said drive belt and the other being in engagement with the lower continuum of said drive belt so as to shorten one continuum while lengthening the other continuum as said pulleys are shifted, and shifting said pulleys so as to effect the changes defined in steps (f) and (g).

42. The method defined in claim 38, wherein the step of providing the single-drive vibration-generating means includes rotating one of said pairs of vibrator shafts at a speed of twice the speed of the other pair of said vibrator shafts.

43. The method defined in claim 38 wherein the changes effected in step (f) thereof are accomplished while said shafts are rotating to thereby change said relative angular displacement between said pairs of shafts during operation of said material-conveying member.

44. The method defined in claim 38 wherein the step of providing a conveyor apparatus includes providing a single drive belt for said pairs of shafts which has an upper and lower continuum, and simultaneously changing the lengths of said upper and lower continuums of said drive belt to thereby change the relative angular displacement between said eccentric weights carried by said second pair of vibrator shafts and said eccentric weights carried by said first pair of vibrator shafts as defined in step (f).

45. The single drive conveyor apparatus defined in claim 1, wherein the shafts of the first of said pairs of vibration-generating shafts carry eccentrically mounted weights of equal mass, and the shafts of the other of said pairs of vibration-generating shafts carry eccentrically mounted weights of a mass equal to those carried by the first of said pairs of vibration-generating shafts, which generate centrifugal forces equal to that of the weights carried by said first pair of shafts.

46. The single drive conveyor apparatus defined in claim 1, wherein one of said pairs of vibration-generating shafts rotates at a faster speed than the other of said pairs of vibration-generating shafts, and each of said shafts carries an eccentrically mounted weight supported by a radially extending support arm, said support arms carrying said weights having lengths such that each of said weights generates an equal force as it is rotated with said shaft to which it is connected.

47. The single drive conveyor apparatus defined in claim 1, wherein one of said pairs of vibration-generating shafts rotates at twice the speed of the other of said pairs of vibration-generating shafts, each of said shafts carrying an eccentrically mounted weight of equal mass supported by a radially extending support arm, wherein the length of each of said support arms is set such that the force generated by each of said eccentric weights during rotation thereof is equal to that generated by each of the other of said rotating eccentric weights.

* * * * *